United States Patent
Koslov

(10) Patent No.: US 7,616,706 B2
(45) Date of Patent: Nov. 10, 2009

(54) REPETITION CODING IN A SATELLITE-BASED COMMUNICATIONS SYSTEM

(75) Inventor: Joshua Lawrence Koslov, Hopewell, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 649 days.

(21) Appl. No.: 10/556,538

(22) PCT Filed: Apr. 30, 2004

(86) PCT No.: PCT/US2004/013478

§ 371 (c)(1),
(2), (4) Date: Nov. 14, 2005

(87) PCT Pub. No.: WO2004/105337

PCT Pub. Date: Dec. 2, 2004

(65) Prior Publication Data

US 2007/0025283 A1 Feb. 1, 2007

Related U.S. Application Data

(60) Provisional application No. 60/471,166, filed on May 16, 2003.

(51) Int. Cl.
*H04L 27/06* (2006.01)
(52) U.S. Cl. .................................... 375/316
(58) Field of Classification Search ............... 375/316, 375/329, 332, 295, 265; 455/164.2, 161.1, 455/179.1; 370/316; 714/794, 795
See application file for complete search history.

(56) References Cited

U.S. PATENT DOCUMENTS

| | | | |
|---|---|---|---|
| 5,448,555 A | 9/1995 | Bremer et al. | |
| 5,646,935 A | 7/1997 | Ishikawa et al. | |
| 5,966,412 A | 10/1999 | Ramaswamy | |
| 6,580,761 B2 | 6/2003 | Laroia et al. | |
| 6,941,120 B2 * | 9/2005 | Barnett et al. | 455/164.2 |
| 7,180,968 B2 * | 2/2007 | Miyauchi et al. | 375/341 |

(Continued)

FOREIGN PATENT DOCUMENTS

EP 0741469 A 11/1996

(Continued)

OTHER PUBLICATIONS

Yoshida M: 'High-quality subcannel for wireless ATM transmission Global Telecommunications Conference, 1996. Globecom '96 'Communications: The Key to Global Prosperity London, UK Nov. 18-22, 1996, New York, NY, USA, IEEE, US Nov. 18, 1996 , pp. 1892-1896, XP010220207 ISBN: 0-7803-3336-5.

*Primary Examiner*—Khai Tran
(74) *Attorney, Agent, or Firm*—Robert D. Shedd; Robert B. Levy

(57) ABSTRACT

A satellite communications system comprises a transmitter, a satellite transponder and a receiver. The transmitter transmits an uplink multi-level modulated signal (hierarchical modulation or layered modulation) to the satellite transponder, which broadcasts the multi-level modulated signal downlink to one, or more, receivers. The transmitter includes a repetition coder for repetition coding at least one level, e.g., a lower level, of the multi-level modulated signal. In complementary fashion, the receiver includes a repetition decoder for use in decoding the at least one repetition coded level of the received multi-level modulated signal.

35 Claims, 29 Drawing Sheets

U.S. PATENT DOCUMENTS

| | | | |
|---|---|---|---|
| 7,209,524 B2 * | 4/2007 | Chen | 375/295 |
| 2002/0051581 A1 * | 5/2002 | Takeuchi et al. | 382/240 |
| 2002/0136317 A1 | 9/2002 | Eleftheriou et al. | |

FOREIGN PATENT DOCUMENTS

| | | | |
|---|---|---|---|
| EP | 0827309 A | 3/1998 |
| WO | WO99/17509 A | 4/1999 |
| WO | WO00/35122 A | 6/2000 |
| WO | WO 01/39453 A1 | 5/2001 |

* cited by examiner

| $LLR_{1,J}$ | | | | $LLR_{L,J}$ |
| --- | --- | --- | --- | --- |
| | | Q | | |
| | | ⋮ | | |
| $LLR_{1,1}$ | | ⋯ | | $LLR_{L,1}$ |

598

I

REPETITION CODING IN A SATELLITE-BASED COMMUNICATIONS SYSTEM

This application claims the benefit, under 35 U.S.C. § 365 of International Application PCT/US04/013478, filed Apr. 30, 2004, which was published in accordance with PCT Article 21(2) on Dec. 2, 2004 in English and which claims the benefit of U.S. provisional patent application No. 60/471,166 filed May 16, 2003.

BACKGROUND OF THE INVENTION

The present invention generally relates to communications systems and, more particularly, to satellite-based communications systems.

As described in U.S. Pat. No. 5,966,412 issued Oct. 12, 1999 to Ramaswamy, hierarchical modulation can be used in a satellite system as a way to continue to support existing legacy receivers yet also provide a growth path for offering new services. In other words, a hierarchical modulation based satellite system permits additional features, or services, to be added to the system without requiring existing users to buy new satellite receivers. In a hierarchical modulation based communications system, at least two signals, e.g., an upper layer (UL) signal and a lower layer (LL) signal, are added together to generate a synchronously modulated satellite signal for transmission. In the context of a satellite-based communications system that provides backward compatibility, the LL signal provides additional services, while the UL signal provides the legacy services, i.e., the UL signal is, in effect, the same signal that was transmitted before—thus, the satellite transmission signal can continue to evolve with no impact to users with legacy receivers. As such, a user who already has a legacy receiver can continue to use the legacy receiver until such time that the user decides to upgrade to a receiver, or box, that can recover the LL signal to provide the additional services.

In a similar vein, a layered modulation based communication system can also be used to provide an approach that is backward compatible. In a layered modulation based system at least two signals are modulated (again, e.g., a UL signal (legacy services) and an LL signal (additional services)) onto the same carrier (possibly asynchronously with each other). Transmission of the UL signal and the LL signal occur separately via two transponders and the front end of a layered modulation receiver combines them before recovery of the data transported therein.

SUMMARY OF THE INVENTION

Whether a hierarchical based modulation or a layered based modulation, we have observed that receiver performance in the presence of noise can be further improved in a multi-level transmission scheme. In particular, and in accordance with the principles of the invention, a transmitter includes a repetition coder for repeating at least a portion of at least one signal of a multi-level modulation scheme to provide a repetition coded signal, and a modulator for providing a multi-level transmission signal, which includes the repetition coded signal.

In an embodiment of the invention, a satellite communications system comprises a transmitter, a satellite transponder and a receiver. The transmitter transmits an uplink multi-level modulated signal (hierarchical modulation or layered modulation) to the satellite transponder, which broadcasts the multi-level modulated signal downlink to one, or more, receivers. The transmitter includes a repetition coder for repetition coding at least one level, e.g., a lower level, of the multi-level modulated signal. In complementary fashion, the receiver includes a repetition decoder for use in decoding the at least one repetition coded level of the received multi-level modulated signal.

In another embodiment of the invention, the receiver is a unified receiver, which operates in any one of a number of demodulation modes for demodulating a received multi-level signal, wherein at least two of the number of demodulation modes are a hierarchical demodulation mode and a layered demodulation mode. The unified receiver includes a repetition decoder for use in decoding at least one repetition coded level of the received multi-level modulated signal.

BRIEF DESCRIPTION OF THE DRAWINGS

FIG. 18 shows an illustrative log-likelihood look-up table in accordance with the principles of the invention;

DETAILED DESCRIPTION

Other than the inventive concept, the elements shown in the figures are well known and will not be described in detail. Also, familiarity with satellite-based systems is assumed and is not described in detail herein. For example, other than the inventive concept, satellite transponders, downlink signals, symbol constellations, a radio-frequency (rf) front-end, or receiver section, such as a low noise block downconverter, formatting and encoding methods (such as Moving Picture Expert Group (MPEG)-2 Systems Standard (ISO/IEC 13818-1)) for generating transport bit streams and decoding methods such as log-likelihood ratios, soft-input-soft-output (SISO) decoders, Viterbi decoders are well-known and not described herein. In addition, the inventive concept may be implemented using conventional programming techniques, which, as such, will not be described herein. Finally, like-numbers on the figures represent similar elements.

Figure 1:
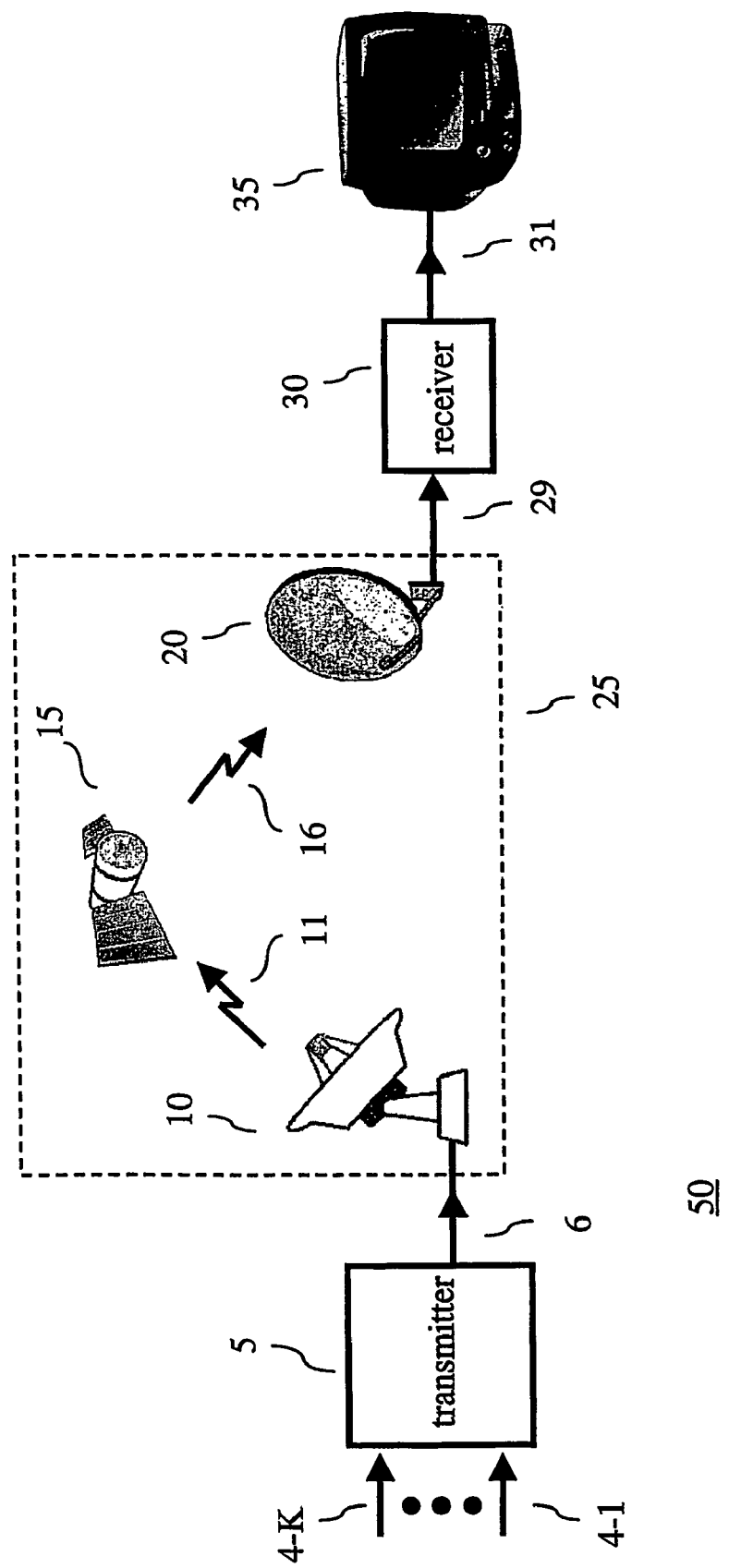
FIG. 1 shows an illustrative satellite communications system embodying the principles of the invention.
Figure 2:
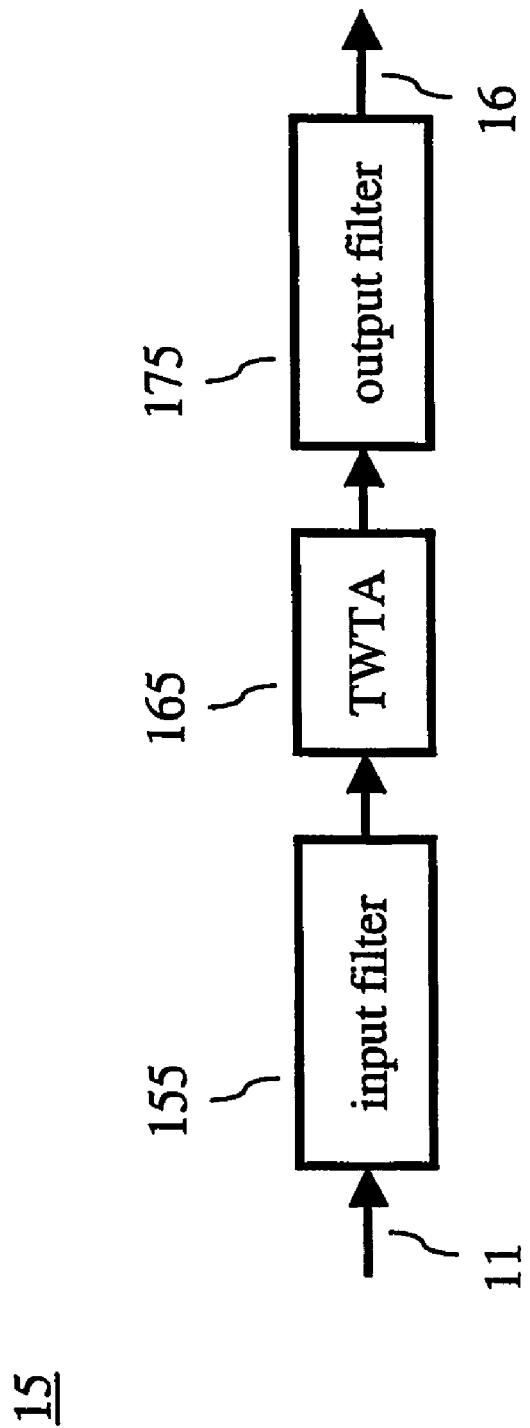
FIG. 2 shows an illustrative block diagram of a transmission path through satellite 15 of FIG. 1.

An illustrative communications system 50 in accordance with the principles of the invention is shown in FIG. 1. Communications system 50 includes transmitter 5, satellite channel 25, receiver 30 and television (TV) 35. Although described in more detail below, the following is a brief overview of communications system 50. Transmitter 5 receives a number of data streams as represented by signals 4-1 through 4-K and, in accordance with the principles of the invention, provides a multi-level modulated signal 6 to satellite transmission channel 25 such that at least one level of the multi-modulated signal 6 is repetition coded (described further below). Illustratively, these data streams represent control signaling, content (e.g., video), etc., of a satellite TV system and may be independent of each other or related to each other, or a combination thereof. The multi-level modulated signal 6 represents either a hierarchical modulation based signal or a layered modulation based signal having K layers, where K≧2. It should be noted that the words "layer" and "level" are used interchangeably herein. Satellite channel 25 includes a transmitting antenna 10, a satellite 15 and a receiving antenna 20. Transmitting antenna 10 (representative of a ground transmitting station) provides multi-level modulated signal 6 as uplink signal 11 to satellite 15. Referring briefly to FIG. 2, an illustrative block diagram of the transmission path through satellite 15 for a signal is shown. Satellite 15 includes an input filter 155, a traveling wave tube amplifier (TWTA) 165 and an output filter 175. The uplink signal 11 is first filtered by input filter 155, then amplified for retransmission by TWTA 165. The output signal from TWTA 165 is then filtered by output filter 175 to provide downlink signal 16 (which is typically at a different frequency than the uplink signal). As such, satellite 15 provides for retransmission of the received uplink signal via downlink signal 16 to a broadcast area. This broadcast area typically covers a predefined geographical region, e.g., a portion of the continental United States. Turning back to FIG. 1, downlink signal 16 is received by receiving antenna 20, which provides a received signal 29 to receiver 30, which demodulates and decodes received signal 29 in accordance with the principles of the invention to provide, e.g., content to TV 35, via signal 31, for viewing thereon. It should be noted that although not described herein, transmitter 5 may further predistort the signal before transmission to compensate for non-linearities in the channel.

Figure 3:
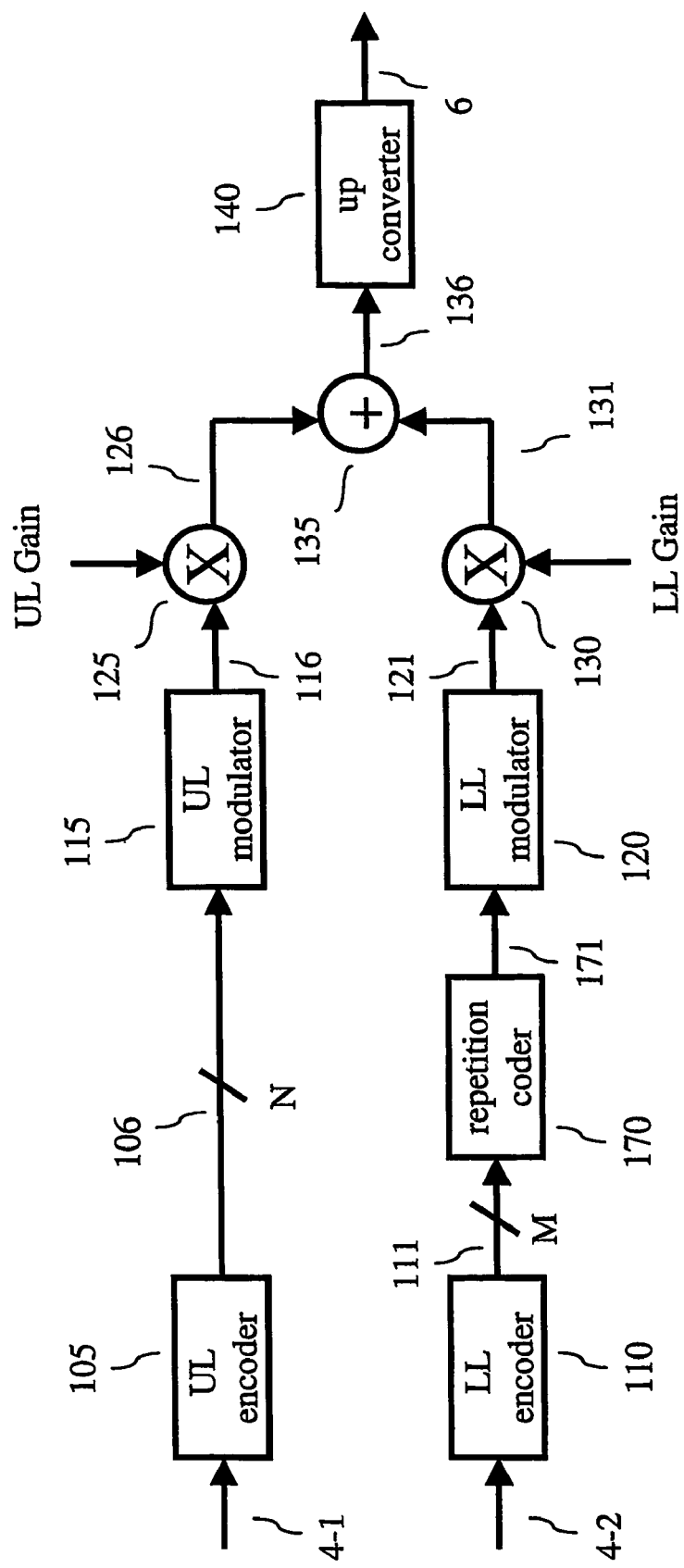
FIG. 3 shows an illustrative hierarchical modulation embodiment in accordance with the principles of the invention for use in transmitter 5 of FIG. 1.
Figure 7:
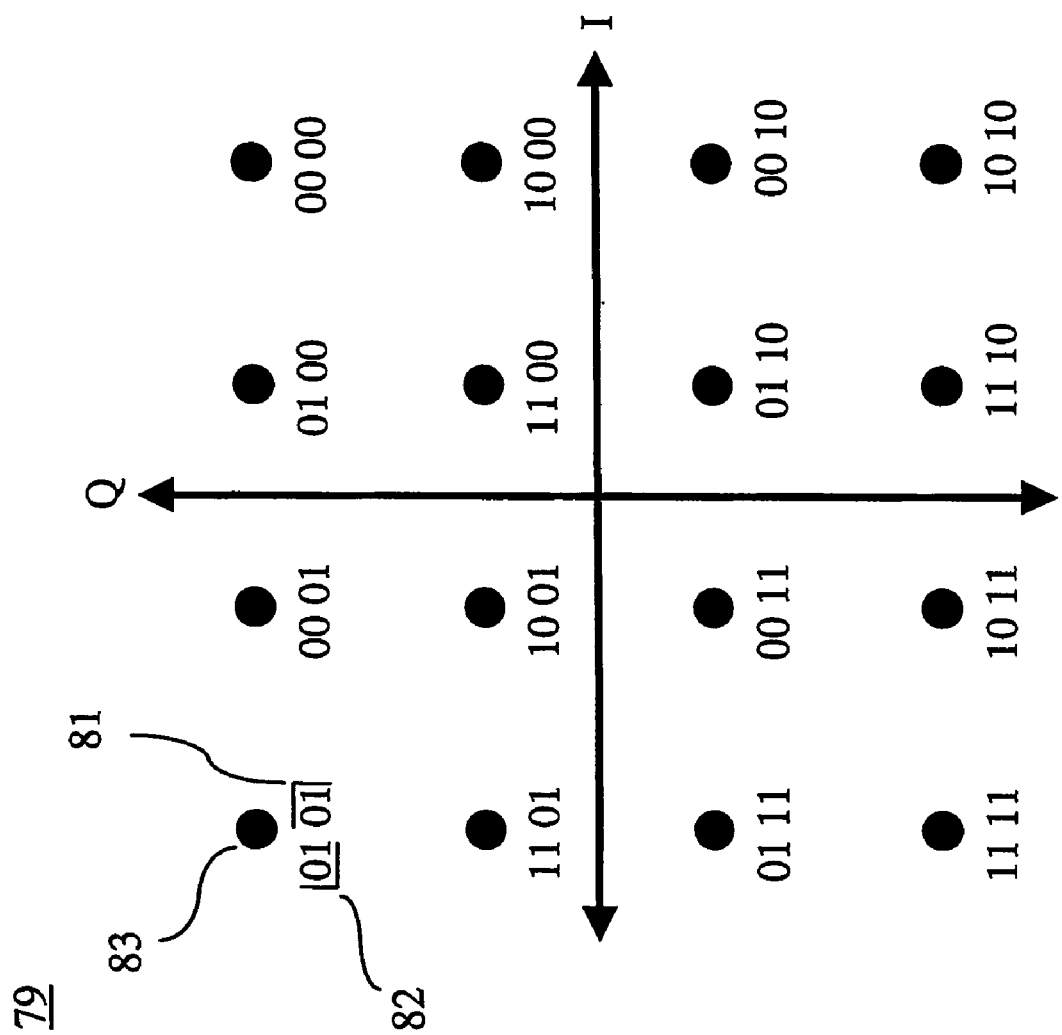
FIG. 7 shows an illustrative resulting signal point constellation for a multi-level signal.

As noted above, in the context of this description multi-level modulated signal 6 represents either a hierarchical modulation based signal or a layered modulation based signal. In the case of the former, an illustrative block diagram for transmitter 5 in accordance with the principles of the invention is shown in FIG. 3; while in the latter case an illustrative block diagram for transmitter 5 in accordance with the principles of the invention is shown in FIG. 7. In the remainder of this description it is illustratively assumed that there are two data streams, i.e., K=2. It should be noted that the invention is not limited to K=2 and, in fact, a particular data stream such as signal 4-1 may already represent an aggregation of other data streams (not shown).

As noted earlier, we have observed that receiver performance in the presence of noise can be further improved in a multi-level transmission scheme. In particular, and in accordance with the principles of the invention, a transmitter includes a repetition coder for repeating at least a portion of at least one signal of a multi-level modulation scheme to provide a repetition coded signal, and a modulator for providing a multi-level transmission signal, which includes the repetition coded signal. It should be noted that performing a repetition-coding scheme on at least one level, e.g., the lower layer, effectively trades off data rate for signal-to-noise ratio (SNR) on that layer. In other words, although the effective data rate of the lower layer is reduced, the use of repetition-coding allows the receiver to recover data from the lower layer in lower SNR environments. Thus, and as described further below, transmitter 5 repetition codes at least a portion of at least one signal level of a multi-level signal and then transmits the multi-level signal, including the repetition coded portion thereof.

Turning first to FIG. 3, an illustrative hierarchical modulation transmitter for use in transmitter 5 is shown. Hierarchical modulation is simply described as a synchronous modulation system where a lower layer signal is synchronously embedded into an upper layer signal so as to create a higher order modulation alphabet.

In FIG. 3, the hierarchical modulation transmitter comprises UL encoder 105, UL modulator 115, LL encoder 110, repetition coder 170, LL modulator 120, multipliers (or amplifiers) 125 and 30, combiner (or adder) 135 and up converter 140. The upper layer (UL) path is represented by UL encoder 105, UL modulator 115 and amplifier 125; while the lower layer (LL) path is represented by LL encoder 110, repetition coder 170, LL modulator 120 and amplifier 130. As used herein, the term "UL signal" refers to any signal in the UL path and will be apparent from the context. For example, in the context of FIG. 3, this is one or more of the signals 4-1, 106 and 116. Similarly, the term "LL signal" refers to any signal in the LL path. Again, in the context of FIG. 3, this is one or more of the signals 4-2, 111, 171 and 121. Further, each of the encoders implement known error detection/correction codes (e.g., convolutional or trellis codes; concatenated forward error correction (FEC) scheme, where a rate ½, ⅔, ⅘ or ⁶⁄₇ convolutional code is used as an inner code, and a Reed Solomon code is used as an outer code; LDPC codes (low density parity check codes); etc.). For example, typically UL encoder 105 uses a convolutional code or a short block code; while LL encoder 110 uses a turbo code or LDPC code. For the purposes of this description it is assumed that LL encoder 110 uses an LDPC code. In addition, a convolutional interleaver (not shown) may also be used.

Figure 4:
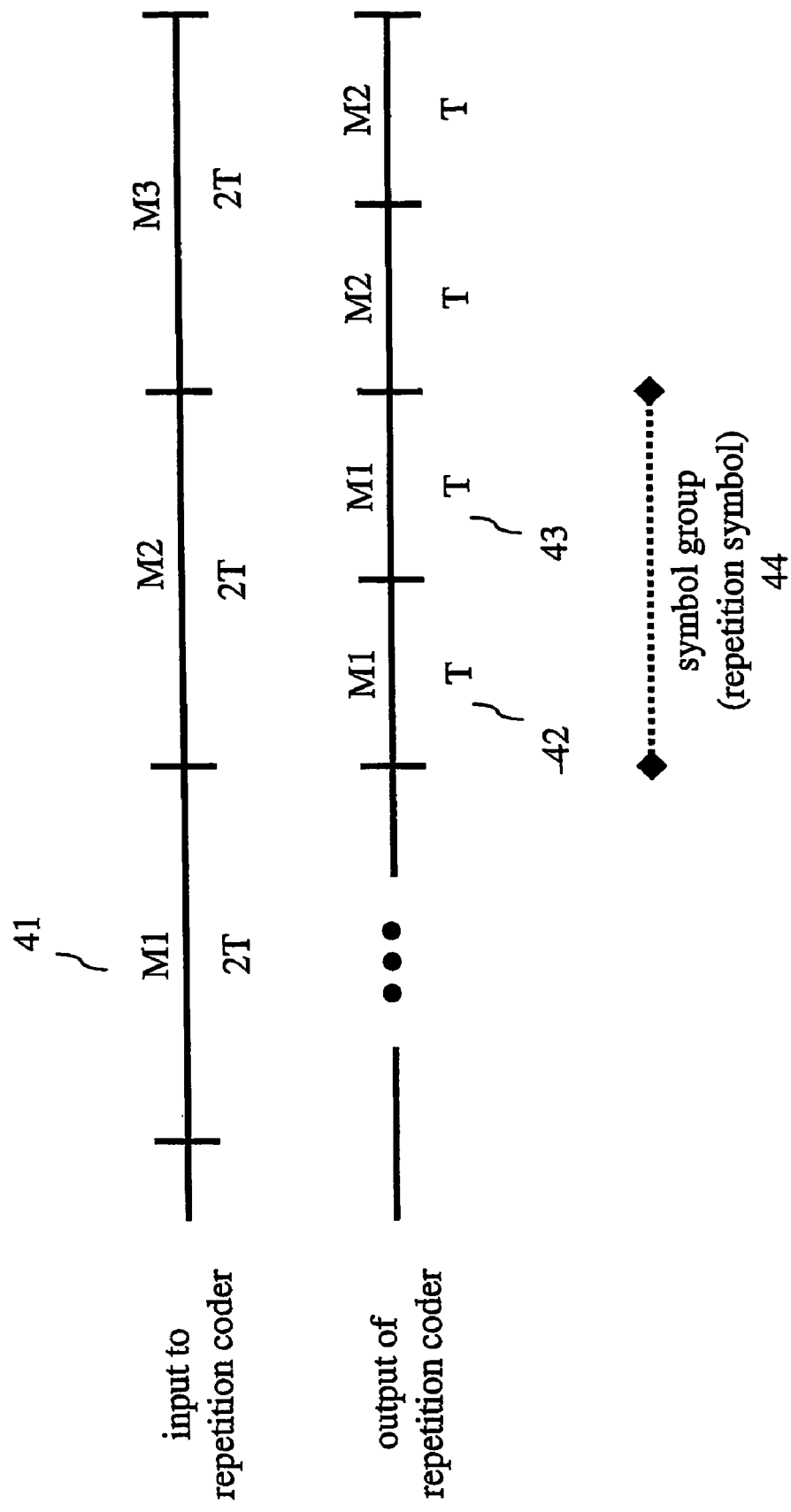
FIG. 4 illustrates repetition coding in accordance with the principles of the invention.
Figure 5:
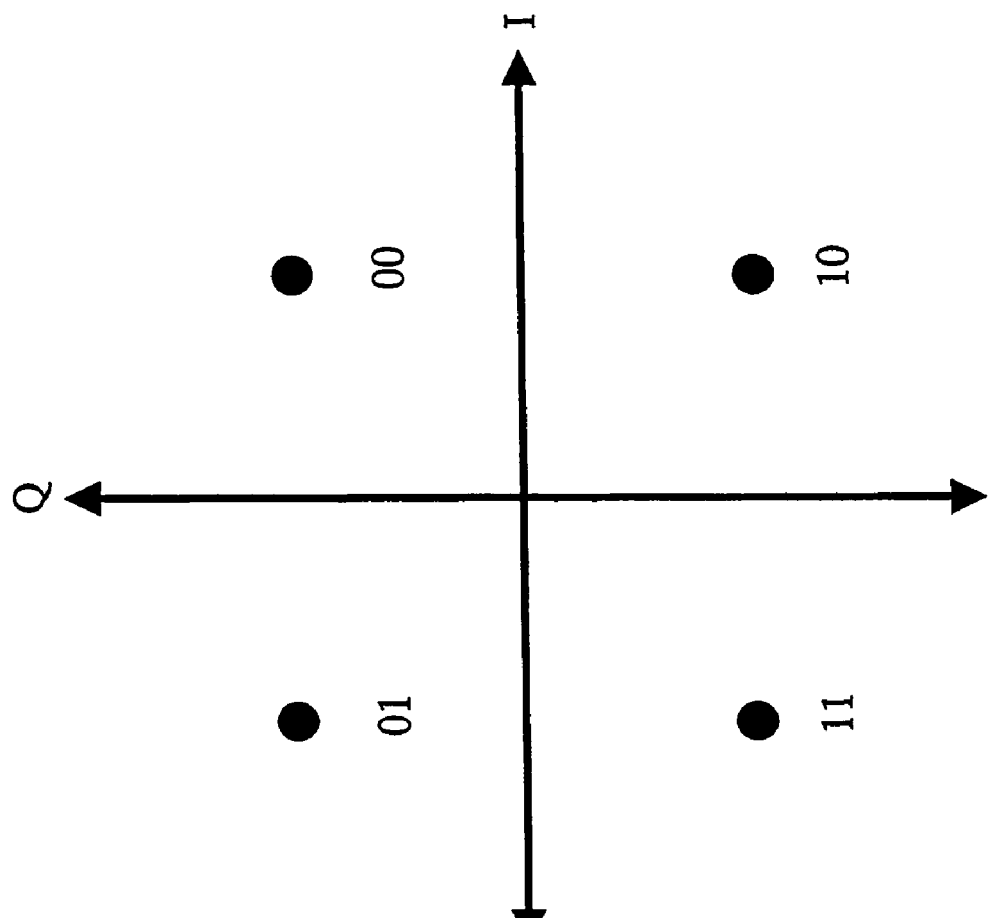
FIG. 5 shows illustrative symbol constellations for use in the upper layer and the lower layer.
Figure 6:
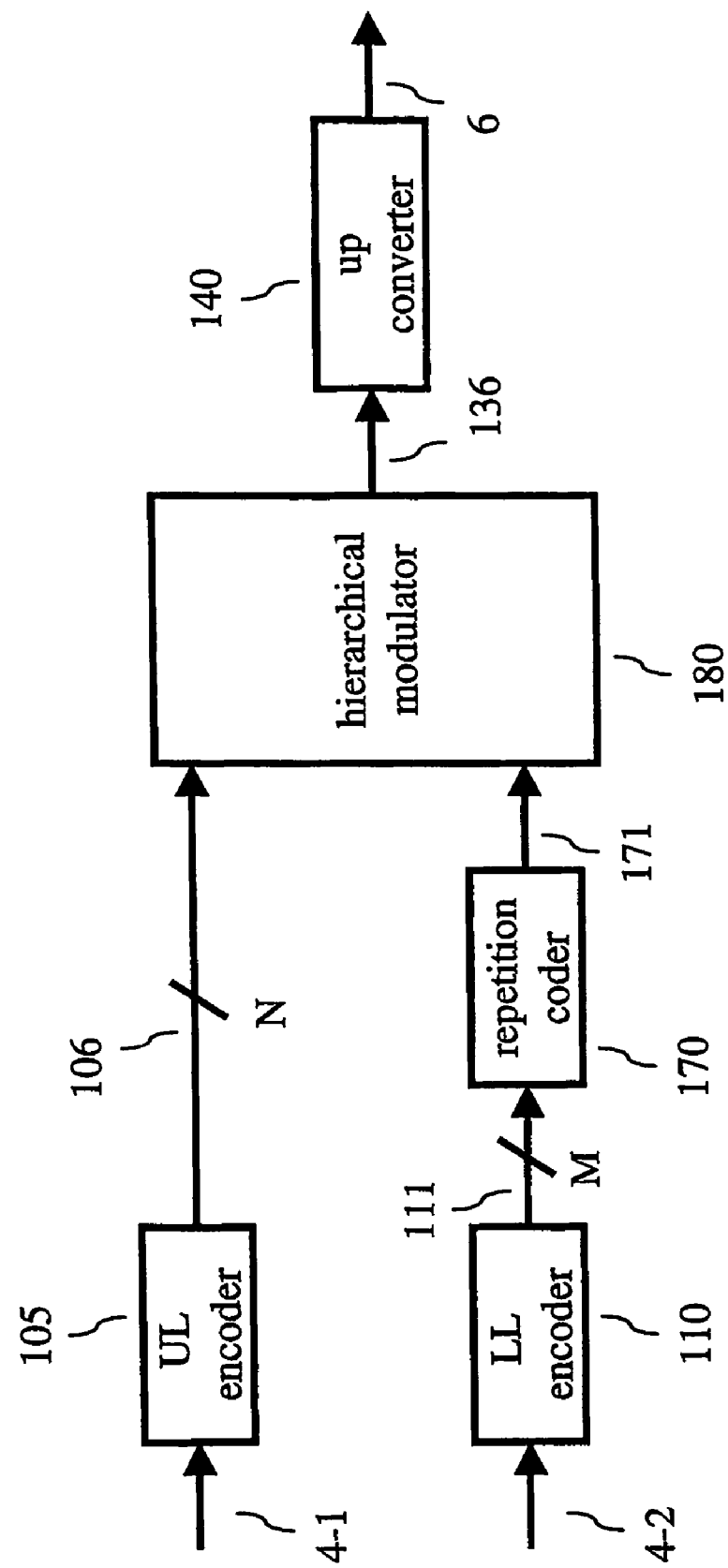
FIG. 6 shows another illustrative hierarchical modulation embodiment in accordance with the principles of the invention for use in transmitter 5 of FIG. 1.

As can be observed from FIG. 3, signal 4-2 is applied to LL encoder 110, which provides an encoded signal 111. Likewise, signal 4-1 is applied to an UL encoder 105, which provides an encoded signal 106 to modulator 115. Encoded signal 106 represents N bits per symbol interval T; while encoded signal 111 represents M bits every JT symbol intervals, where N may, or may not, equal M and J>1. Repetition coder 170 further repetition codes encoded signal 111 by receiving the M bits of data every J symbol intervals and providing the M bits of data every symbol interval to modulator 120. In other words, repetition coder 170 repeats, or duplicates, the M bits of data across the J symbol intervals. In this context, the grouping of the M bits across the J symbol intervals or the grouping of the associated J symbols, define a symbol group or repetition symbol. This is illustrated in FIG. 4 for J=2. LL encoder 110 provides M1 bits to repetition coder 170 in 2T time interval 41. Repetition coder 170 provides the M1 bits to modulator 120 (operating at the symbol rate 1/T) in time interval 42 and, again, in time interval 43. Modulators 115 and 120 modulate the respective signals applied thereto to provide modulated signals 116 and 121, respectively. It should be noted that since there are two modulators, 115 and 120, the modulation can be different in the UL path and the LL path. Again, for the purposes of this description it is assumed that the number of UL encoded data bits is two, i.e., N=2, and that UL modulator 115 generates a modulated signal 116 that lies in one of four quadrants of a signal space. That is, UL modulator 115 maps two encoded data bits to one of four signal points. Similarly, the number of LL encoded data bits is also assumed to be two, i.e., M=2, and LL modulator 120 also generates a modulated signal 121 that lies in one of four quadrants of the signal space. An illustrative symbol constellation 89 for use in both the UL and the LL is shown in FIG. 5. In this example, each repetition symbol 44 of the LL is mapped from J identical M-bit groups from repetition coder 170 into symbols from symbol constellation 89. It should be noted that signal space 89 is merely illustrative and that symbol constellations of other sizes and shapes can be used. Turning briefly to FIG. 6, another illustrative embodiment for implementing hierarchical modulation in transmitter 5 is shown. FIG. 6 is similar to FIG. 3 except that hierarchical modulator 180 performs the mapping of the lower layer and upper layer bits into the combined signal space. For example, the upper layer may be a QPSK (quadrature phase-shift keying) signal space, while the lower layer is a BPSK (binary phase-shift keying) signal space; combining the two could result, e.g., in a non-uniform 8-PSK signal space.

Returning to FIG. 3, the output signals from UL modulator 115 and LL modulator 120 are further adjusted in amplitude by a predefined UL gain and a predefined LL gain via amplifiers 125 and 130, respectively. It should be noted that the gains of the lower and upper layer signals determine the ultimate placement of the points in the signal space. For example, the UL gain may be set to unity, i.e., 1, while the LL gain may be set to 0.5. The UL signal and the LL signal are then combined via combiner, or adder, 135, which provides combined signal 136. Thus, the modulator of FIG. 3, e.g., the amplifiers 125 and 130, along with combiner 135, effectively further rearranges and partitions the signal space such that the UL signal specifies one of the four quadrants of the signal space; while the LL signal specifies one of a number of subquadrants of a particular quadrant of the signal space as illustrated in FIG. 7 by signal space 79.

In effect, the resulting signal space 79, also referred to herein as the combined signal space 79, comprises 16 symbols, each symbol located at a particular signal point in the signal space and associated with a particular four bits. For example, symbol 83 is associated with the four bit sequence "01 01". The lower two bit portion 81 is associated with the UL and specifies a quadrant of signal space 79; while the upper two bit portion 82 is associated with the LL and specifies a subquadrant of the quadrant specified by two bit portion 81. It should be noted that since the UL signal identifies the quadrant, the LL signal effectively looks like noise on the UL signal. Returning to FIG. 3, the combined signal 136 is applied to up converter 140, which provides multi-level modulated signal 6 at the appropriate transmission frequency.

From this example, it can be observed from FIG. 7 that, in effect, each symbol in a transmitted sequence may be different from a following symbol since only the upper two bit portion associated with the LL signal is repeated over the J symbol intervals of a symbol group. As such, the two resulting symbols (not shown) from signal space 79 representing the M1 bits in time intervals 42 and 43 of FIG. 4 also comprise repetition symbol 44.

Figure 8:
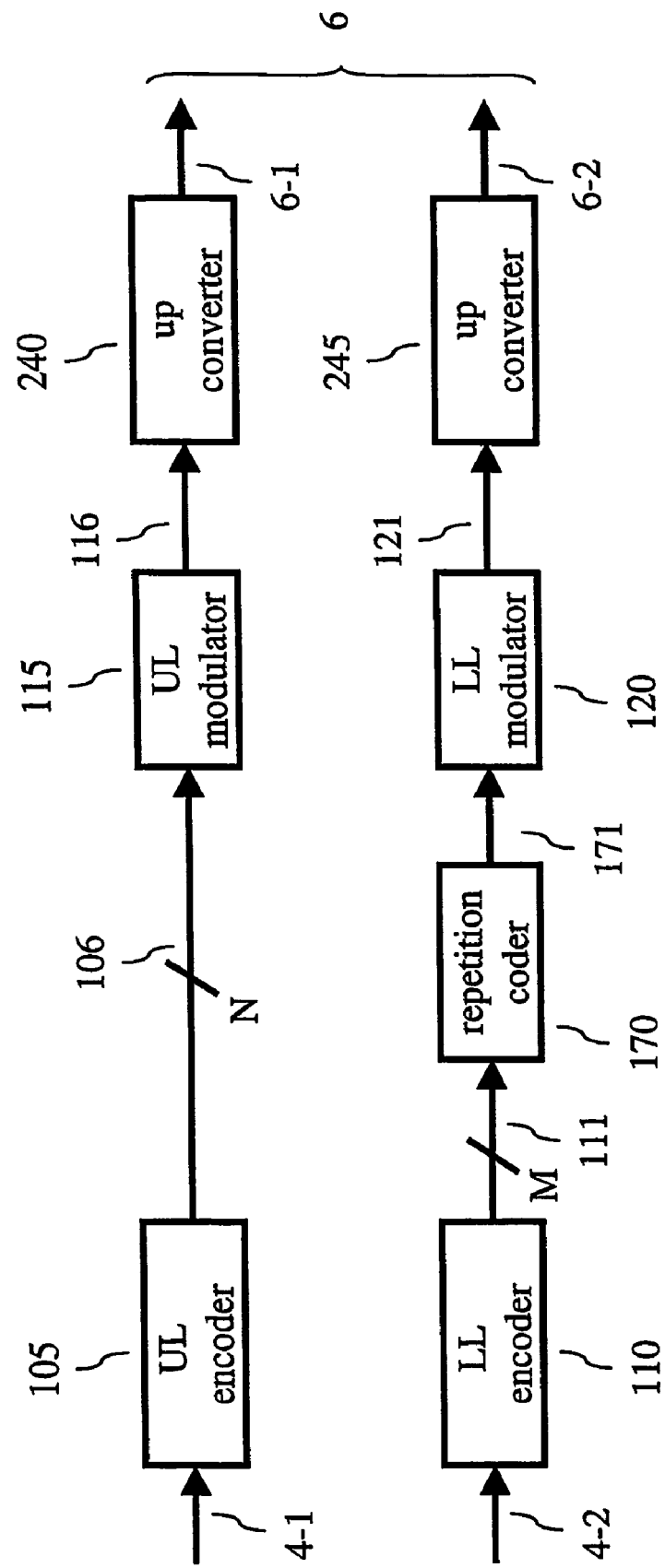
FIG. 8 shows an illustrative layered modulation embodiment in accordance with the principles of the invention for use in transmitter 5 of FIG. 1.

Turning now to FIG. 8, an illustrative block diagram of a layered modulator in accordance with the principles of the invention for use in transmitter 5 of FIG. 1 is shown. Here, transmitter 5 comprises two separate transmitter paths. The upper layer path includes UL encoder 105, UL modulator 115 and up converter 240. The lower layer path includes LL encoder 110, repetition coder 170, LL modulator 120 and up converter 245. Signal 4-1 is encoded by UL encoder 105 to provide encoded signal 106 representing N bits every symbol interval, T, and signal 4-2 is encoded by LL encoder 110 to provide encoded signal 111 representing M bits every J symbol intervals. Again, each of the encoders implement known error detection/correction codes and M may, or may not, be equal to N. The UL encoded signal 106 is then modulated by UL modulator 115 to provide UL modulated signal 116, which is then upconverted to the appropriate frequency band to provide UL signal 6-1. However, LL encoded signal 111 is first applied to repetition coder 170 which repeats the M bits over J symbol intervals, as described above. The resulting repetition-coded signal 171 is applied to LL modulator 120, which provides LL modulated signal 121, which is then upconverted by up converter 245 to provide LL signal 6-2. It should be observed from FIG. 8 that transmitter 5 transmits two signals, i.e., multi-level modulated signal 6 comprises UL signal 6-1 and repetition-coded LL signal 6-2. Typically, LL signal 6-2 is transmitted at a lower power level than UL signal 6-1. This effectively lowers the SNR for the LL path. However, and in accordance with a feature of the invention, the use of repetition coding on the LL path improves the performance of receiver 30 of FIG. 1 for lower SNRs at the expense of a reduced data rate over the LL path.

Figure 9:
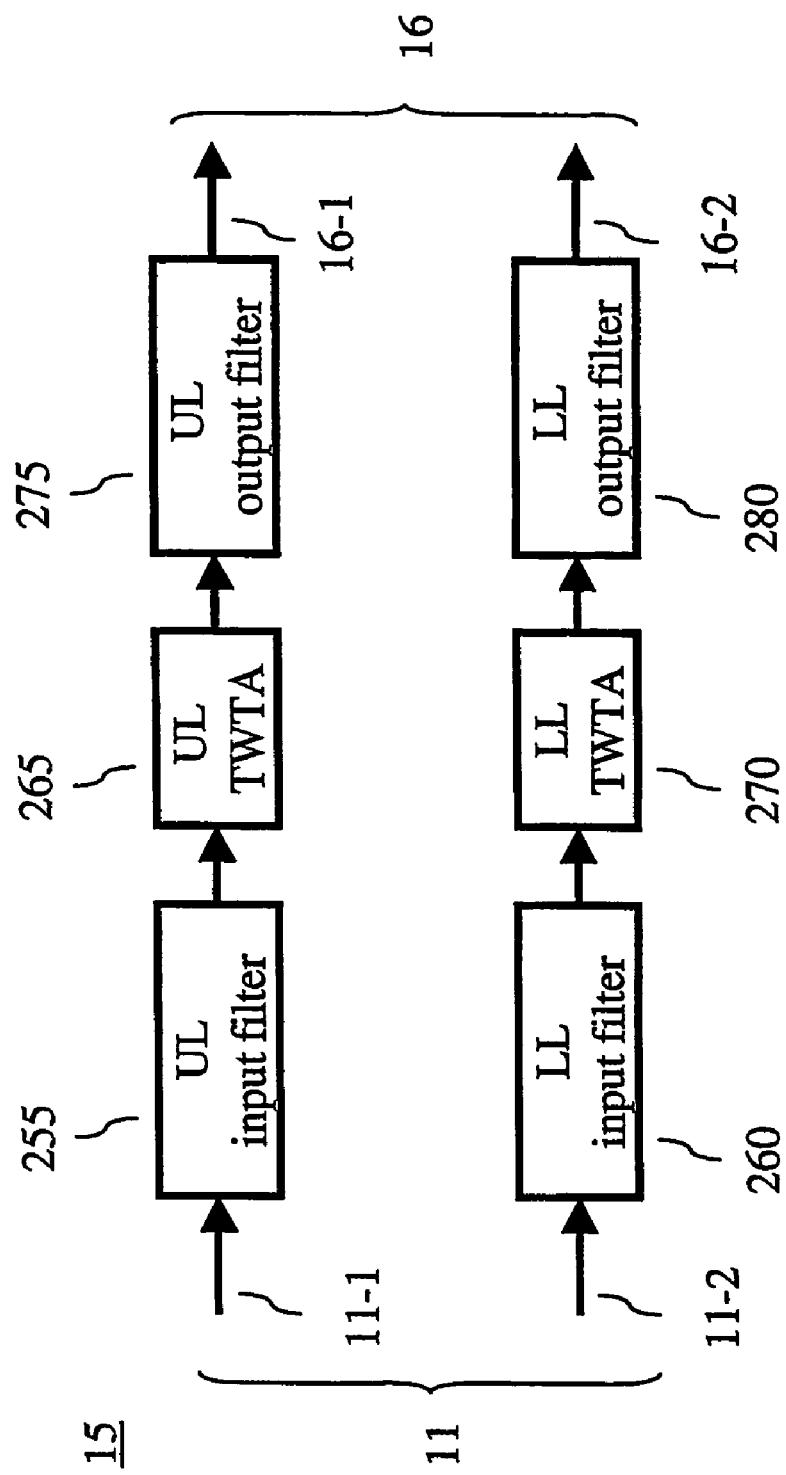
FIG. 9 shows an illustrative block diagram of a satellite transmission path in the context of a layered modulation based system.

As such, and referring now to FIG. 9, for a layered modulation based system uplink signal 11 represents two uplink signals—UL uplink signal 11-1 and LL uplink signal 11-2; while downlink signal 16 represents two downlink signals: LL downlink signal 16-2 and UL downlink signal 16-1. In this example, satellite 15 of FIG. 1 may be a single satellite with two different transponders (one for the UL signal and the other for the LL signal) or two different satellites. Whether one satellite or two, as shown in FIG. 9 there are, in effect, two satellite transmission paths. The UL satellite path includes UL input filter 255, UL TWTA 265 and UL output filter 275, which provides UL downlink signal 16-1; while the LL satellite path includes LL input filter 260, LL TWTA 270 and LL output filter 280, which provides LL downlink signal 16-2. Each of the elements of FIG. 9 function in a similar fashion to the respective elements shown in FIG. 2 and described earlier.

Figure 10:
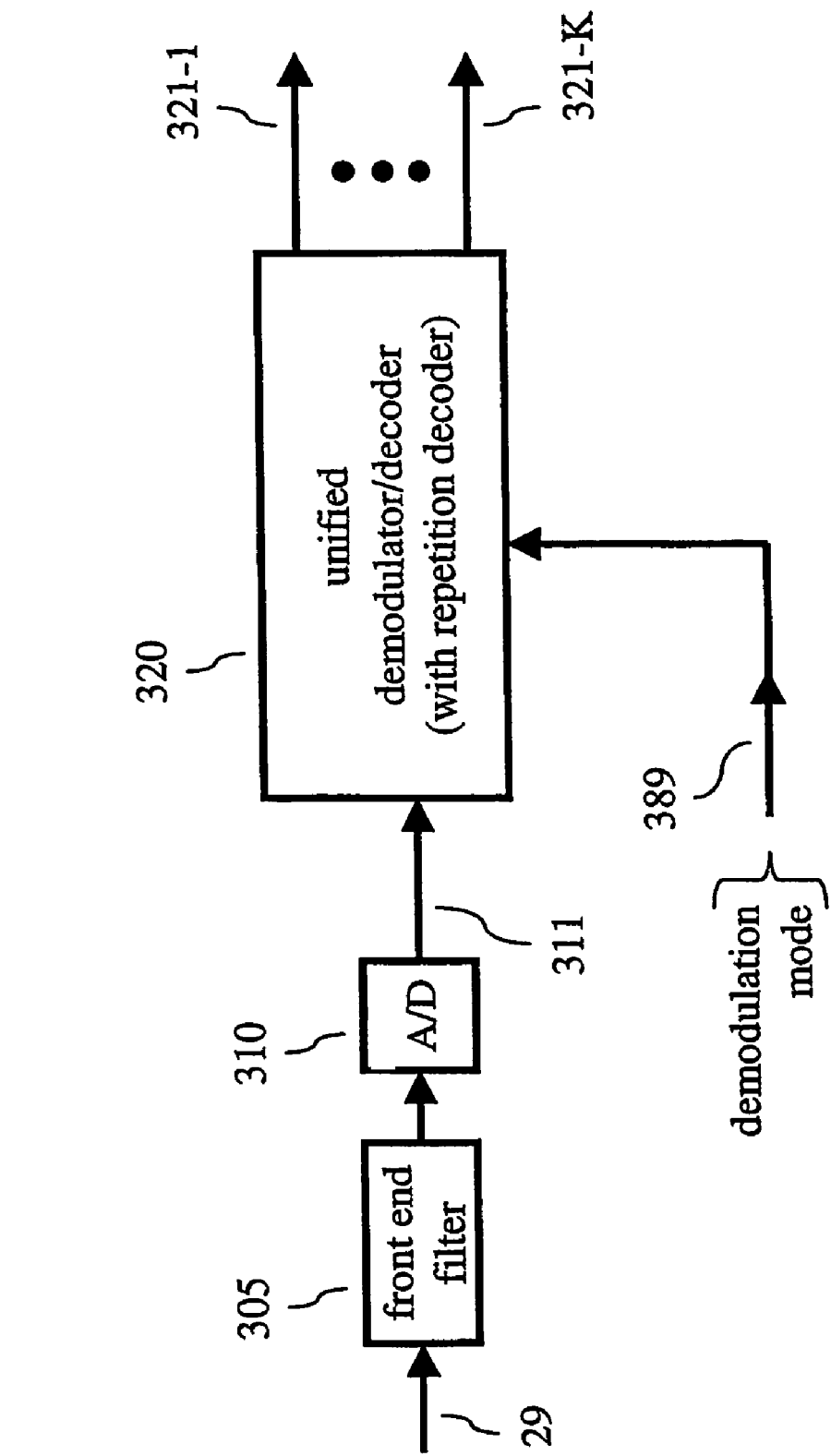
FIG. 10 shows an illustrative block diagram of a receiver in accordance with the principles of the invention.

As noted above, after reception of the downlink signal 16 by receiving antenna 20, receiver 30 demodulates and decodes received signal 29 to provide, e.g., content to TV 35 for viewing thereon. An illustrative portion of receiver 30 in accordance with the principles of the invention is shown in FIG. 10. Receiver 30 includes front end filter 305, analog-to-digital converter 310 and unified demodulator/decoder 320. The latter, in accordance with the principles of the invention, includes a repetition decoder. Front end filter 305 down-converts and filters received signal 29 to provide a near baseband signal to A/D 310, which samples the down converted signal to convert the signal to the digital domain and provide a sequence of samples 311 (also referred to as multi-level signal 311) to unified demodulator/decoder 320. The latter has a number of demodulation modes, where at least two of the demodulation modes represent a hierarchical demodulation mode and a layered demodulation mode. The selection of a particular demodulation mode is provided by demodulation mode signal 389, which is illustratively set a priori. Demodulation mode signal 389 can be set in any one of a number of ways, e.g., a jumper setting, configuration information (not shown) of receiver 30 that may be viewable, e.g., on TV set 35, and settable, e.g., via a remote control (not shown), or from data transmitted on an out-of-band or an in-band signaling channel. If set in the hierarchical demodulation mode, unified demodulator/decoder 320 performs hierarchical demodulation of multi-level signal 311 and provides a number of output signals, 321-1 to 321-K, representative of data conveyed by multi-level signal 311 on the K layers. Data from one or more of these output signals are provided to TV set 35 via signal 31. (In this regard, receiver 30 may additionally process the data before application to TV set 35 and/or directly provide the data to TV set 35.) In the following example the number of levels is two, i.e., K=2, but the inventive concept is not so limited. For example, in the hierarchical demodulation mode, unified demodulator/decoder 320 provides UL signal 321-1 and LL signal 321-2. The former ideally represents what was transmitted on the upper layer, i.e., signal 4-1 of FIG. 3; while the latter ideally represents what was transmitted on the lower layer, i.e., signal 4-2 of FIG. 3. Similarly, if set in the layered demodulation mode, unified demodulator/decoder 320 performs layered demodulation of multi-level signal 311 to provide UL signal 321-1 and LL signal 321-2, which ideally represents signals 4-1 and 4-2 of FIG. 8.

Figure 11:
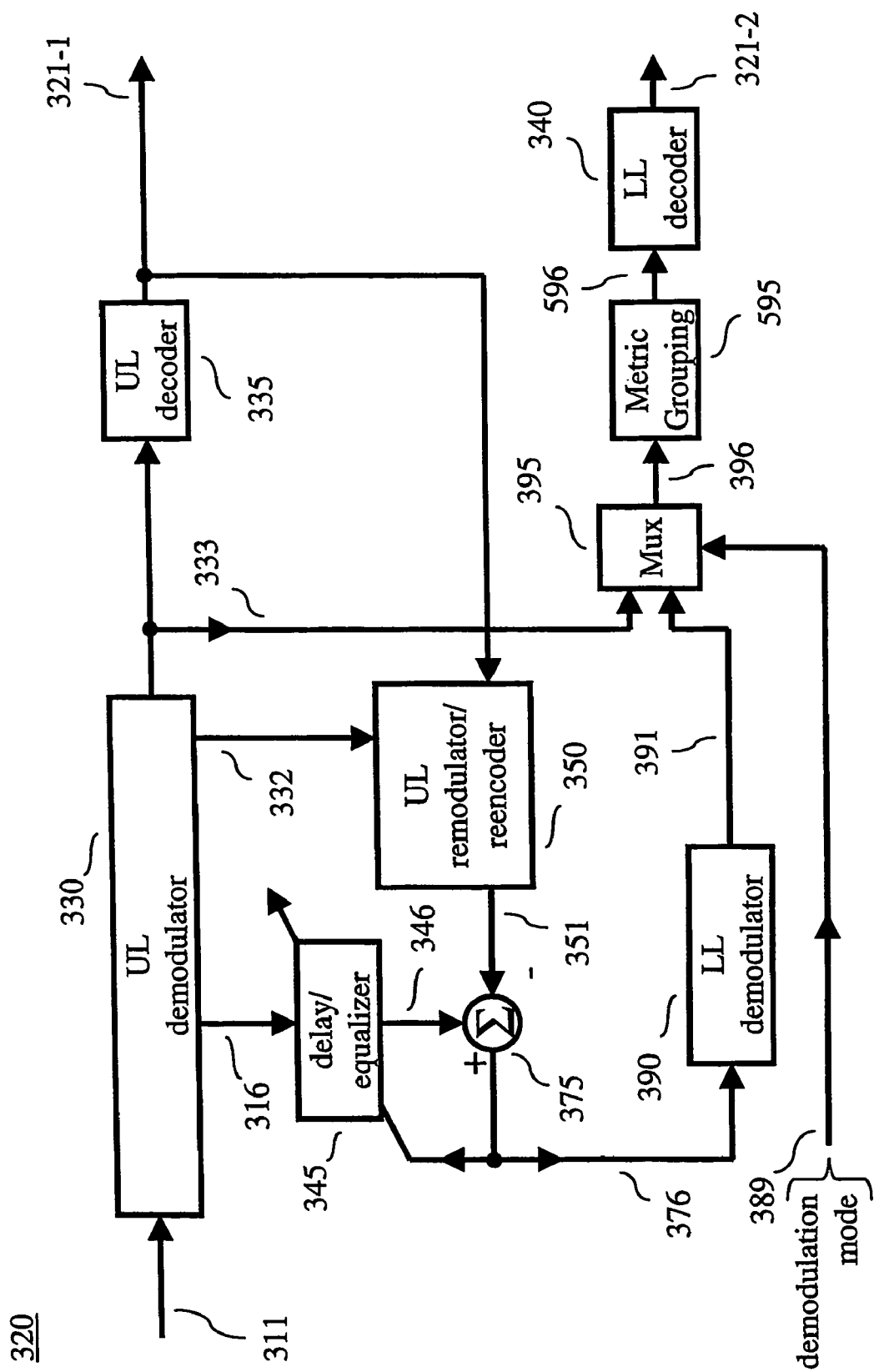
FIG. 11 shows an illustrative block diagram of unified demodulator/decoder 320 of FIG. 10 in accordance with the principles of the invention.
Figure 12:
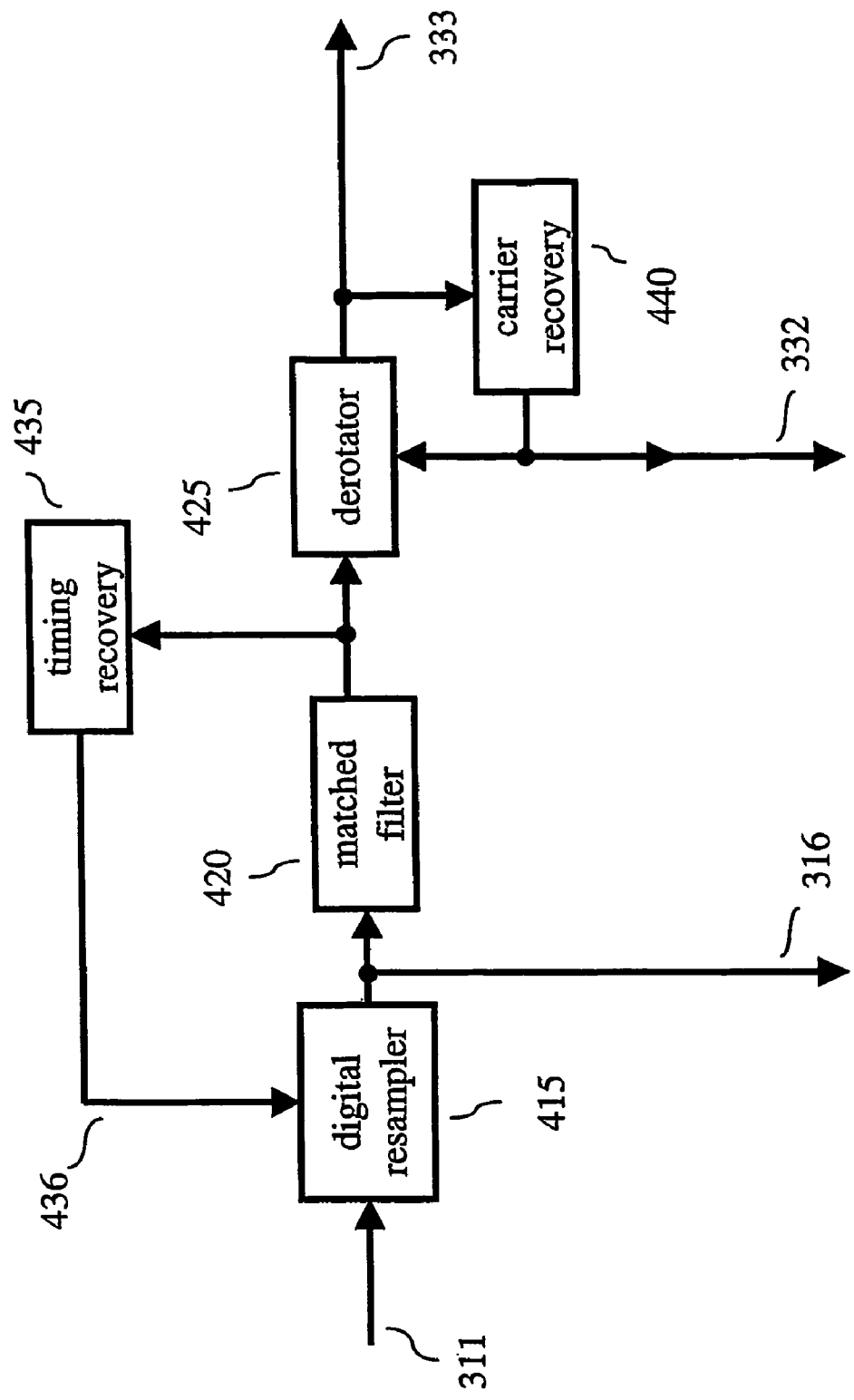
FIGS. 12-16 show various blocks diagrams of different portions of unified demodulator/decoder 320 in accordance with the principles of the invention.

Turning now to FIG. 11, an illustrative architecture for unified demodulator/decoder 320 is shown. Unified demodulator/decoder 320 comprises UL demodulator 330, delay/equalizer element 345, UL decoder 335, UL remodulator/reencoder 350, combiner 375, LL demodulator 390, H-L multiplexer (H-L mux) 395 (also referred to herein as H-L selector 395), metric grouping element 595 and LL decoder 340. Multi-level signal 311 is applied to UL demodulator 330, which demodulates this signal and provides therefrom a UL carrier signal 332, a resampled multi-level signal 316 and a demodulated UL signal as represented by demodulated UL signal point stream 333. Referring now to FIG. 12, an illustrative block diagram of UL demodulator 330 is shown. UL demodulator 330 includes digital resampler 415, matched filter 420, derotator 425, timing recovery element 435 and carrier recovery element 440. Multi-level signal 311 is applied to digital resampler 415, which resamples multi-level signal 311 using UL timing signal 436, which is provided by timing recovery element 435, to provide resampled multi-level signal 316. Resampled multi-level signal 316 is applied to matched filter 420 and is also provided to delay/equalizer element 345 (described below). Matched filter 420 is a bandpass filter for filtering resampled multi-level signal 316 about the UL carrier frequency to provide a filtered signal to both derotator 425 and the above-mentioned timing recovery element 435, which generates therefrom UL timing signal 436. Derotator 425 derotates, i.e., removes the carrier from the filtered signal to provide a demodulated UL signal point stream 333. Carrier recover element 440 uses the demodulated UL signal point stream 333 to recover therefrom UL carrier signal 332, which is applied to derotator 425 and to UL remodulator/reencoder 350 (described below).

Referring back to FIG. 11, UL decoder 335 acts in a complementary fashion to corresponding UL encoder 105 of transmitter 5 and decodes the demodulated UL signal point stream 333 to provide UL signal 321-1. As noted above, UL signal 321-1 represents the data conveyed on the upper layer, e.g., as represented by signal 4-1 of FIGS. 3 and 8. It should be observed that UL decoder 321-1 recovers the data conveyed in the UL by, in effect, treating the LL signal as noise on the UL signal. In other words, UL decoder 335 operates as if UL signal 333 represents symbols selected from signal space 89 of FIG. 5.

Figure 13:
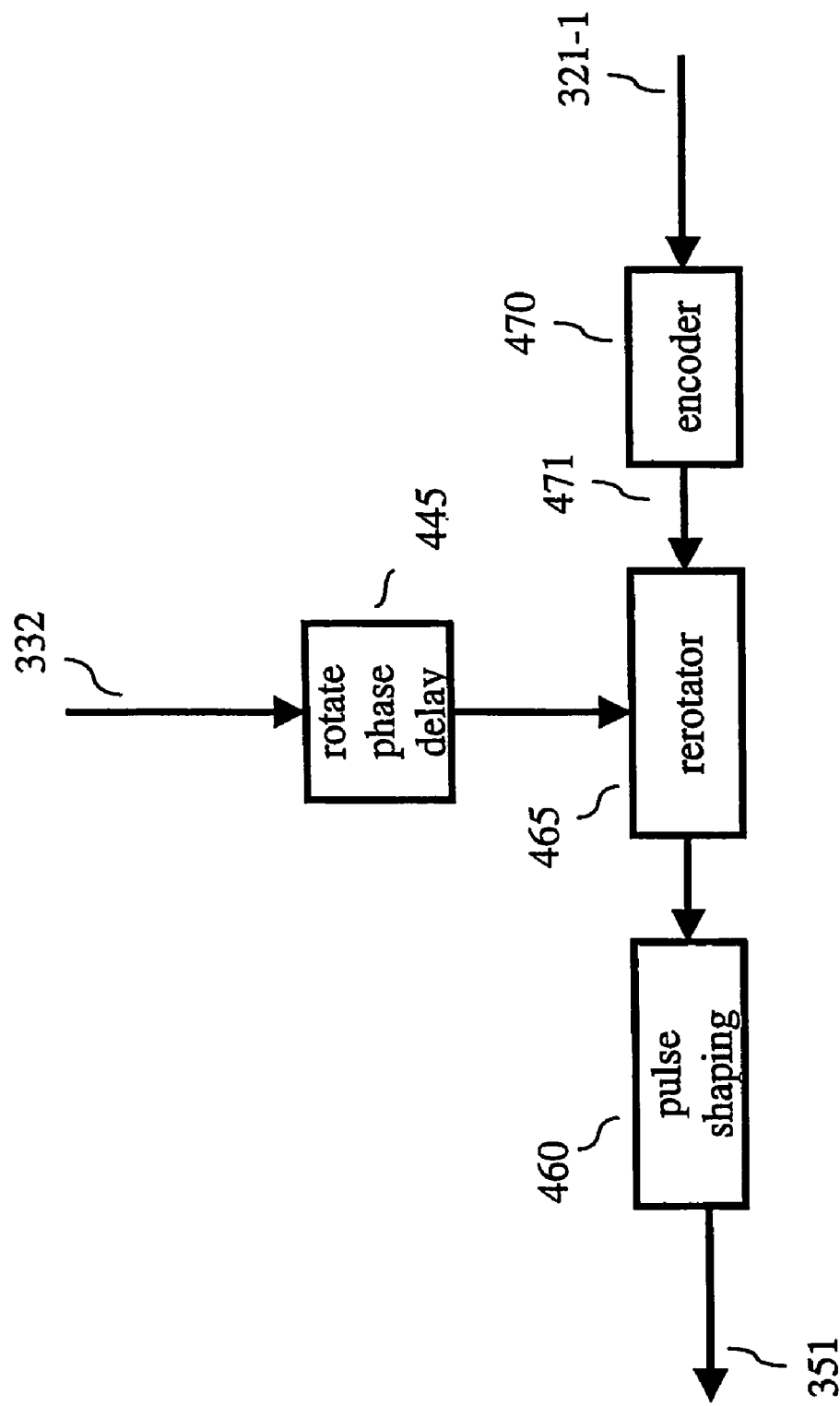

UL signal 321-1 is also applied to remodulator/reencoder 350, which, responsive to UL carrier signal 332, locally reconstructs the UL modulated signal. In particular, remodulator/reencoder 350 reencodes and then remodulates UL signal 321-1 to provide UL modulated signal 351 to a negative input terminal of combiner 375. Referring briefly to FIG. 13, a block diagram of an illustrative remodulator/reencoder 350 is shown. Remodulator/reencoder 350 includes rotate phase delay element 445, encoder 470, rerotator 465 and pulse shaping element 460. Encoder 470 reencodes and remaps to symbols UL signal 321-1 to provide an encoded signal 471 to rerotator 465, which re-rotates encoded signal 471 by a delayed version of the locally generated UL carrier frequency, as determined by the upper layer carrier recovery element 440. The output signal from rerotator 465 is applied to pulse shaping element 460, which further shapes the reconstructed signal to provide UL modulated signal 351.

Turning back to FIG. 11, combiner 375 subtracts UL modulated signal 351 from a delayed and equalized version (signal 346) of resampled multi-level signal 316 to provide a signal representative of just the received LL modulated signal, i.e., LL modulated signal 376, which is also used to update taps (not shown) of the equalizer of delay/equalizer element 345.

Figure 14:
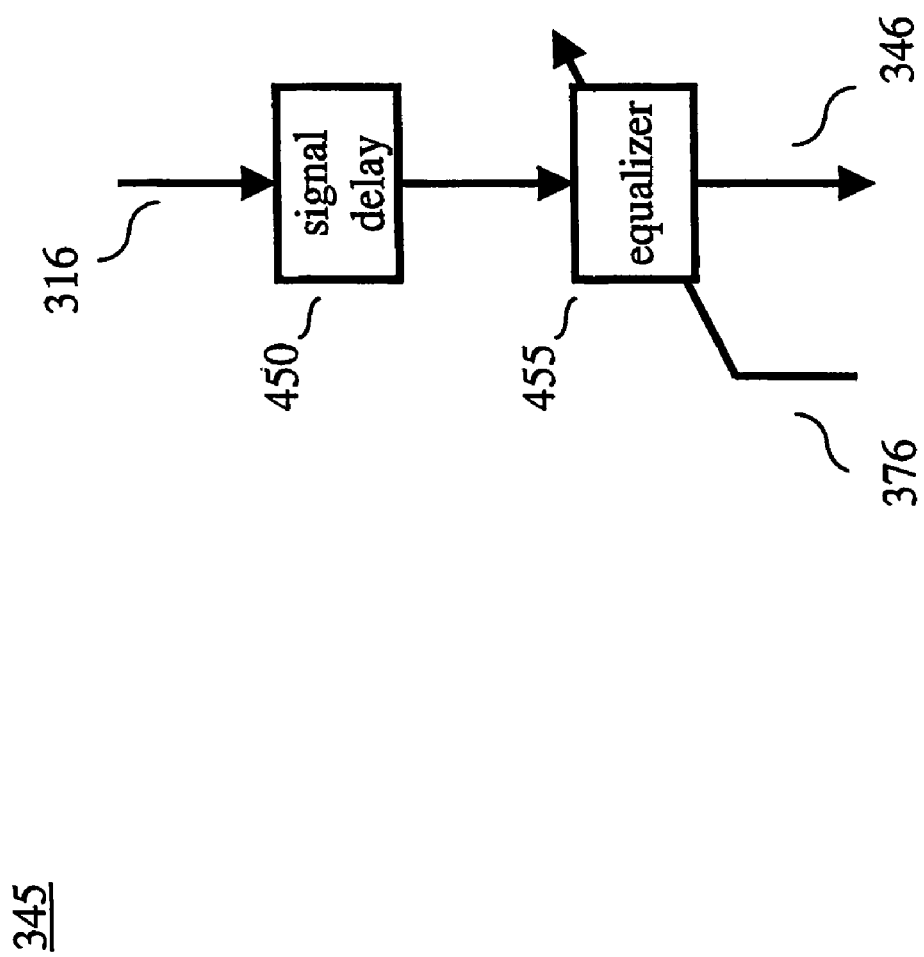

The two input signals to the combiner 375 are at the same sampling rate, which is typically an integer multiple of the upper layer symbol rate. An illustrative block diagram of delay/equalizer element 345 is shown in FIG. 14. Delay/equalizer element 345 includes signal delay element 450 and equalizer 455. Signal delay element 450 compensates for the delay in the signal processing path through UL demodulator 330, decoder 335 and remodulator/reencoder 350; while equalizer 455 attempts to remove linear distortions, such as tilts on the signal path in the tuner, such that combiner 375, in effect, cancels as much of the UL signal as possible from the resampled multi-level signal 316 to provide a clean IL modulated signal 376. In other words, equalization is performed to optimally match the UL component of resampled multi-level signal 316 to locally reconstructed UL modulated signal 351 so as to optimally remove the UL signal before demodulating and decoding the LL signal.

Figure 15:
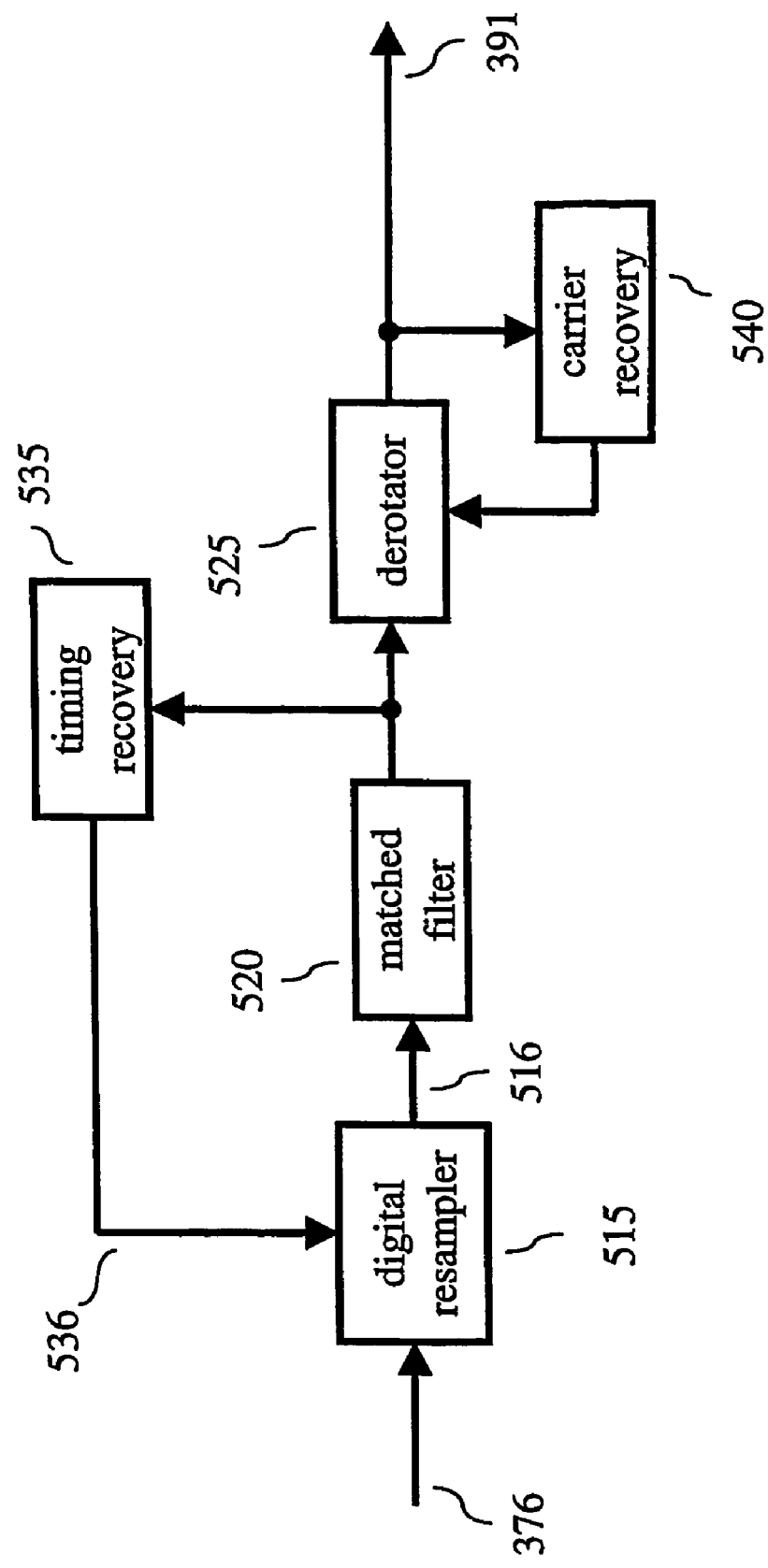

Returning again to FIG. 11, LL modulated signal 376 is then applied to LL demodulator 390, which recovers therefrom a demodulated LL signal as represented by demodulated LL signal point stream 391. An illustrative block diagram of LL demodulator 390 is shown in FIG. 15. LL demodulator 390 includes digital resampler 515, matched filter 520, timing recovery element 535, derotator 525, and carrier recovery element 540. LL modulated signal 376 is applied to digital resampler 515, which resamples LL modulated signal 376 using LL timing signal 536 to bring the LL signal to the initial LL processing rate, which is typically, an integer multiple of the lower layer symbol rate. Digital resampler 515 works in conjunction with timing recovery element 535. Resampled LL modulated signal 516 is applied to matched filter 520, which is a band-pass filter for filtering and shaping resampled LL modulated signal 516 about the LL carrier frequency to provide a filtered signal to both derotator 525 and the above-mentioned timing recovery element 535, which generates therefrom LL timing signal 536. Derotator 525 derotates the filtered signal to provide a demodulated LL signal point stream 391, which is also applied to carrier recover element 540. The latter uses the demodulated LL signal point stream 391 to provide a recovered LL carrier signal to derotator 525.

Returning once again to FIG. 11, H-L mux 395 receives demodulated UL signal point stream 333 and demodulated LL signal point stream 391. H-L mux 395 selects either UL signal point stream 333 or LL signal point stream 391 for processing and subsequent application to metric grouping element 595 as a function of demodulation mode signal 389. If demodulation mode signal 389 indicates layered demodulation, then H-L mux 395 selects LL signal point stream 391 for processing. However, if demodulation select signal 389 indicates hierarchical demodulation, then H-L mux 395 selects UL signal point stream 333 for processing.

Figure 16:
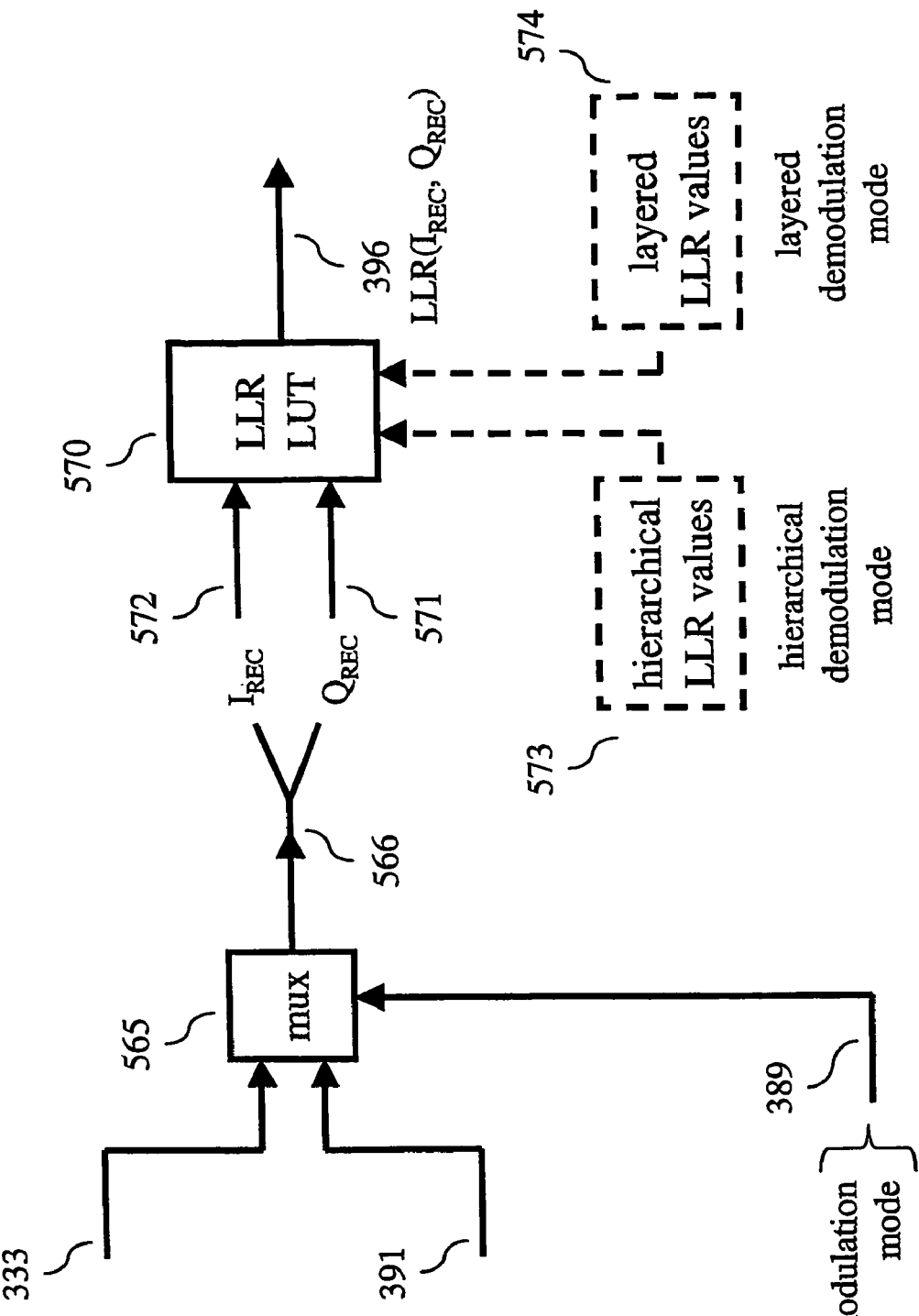
Figure 17:
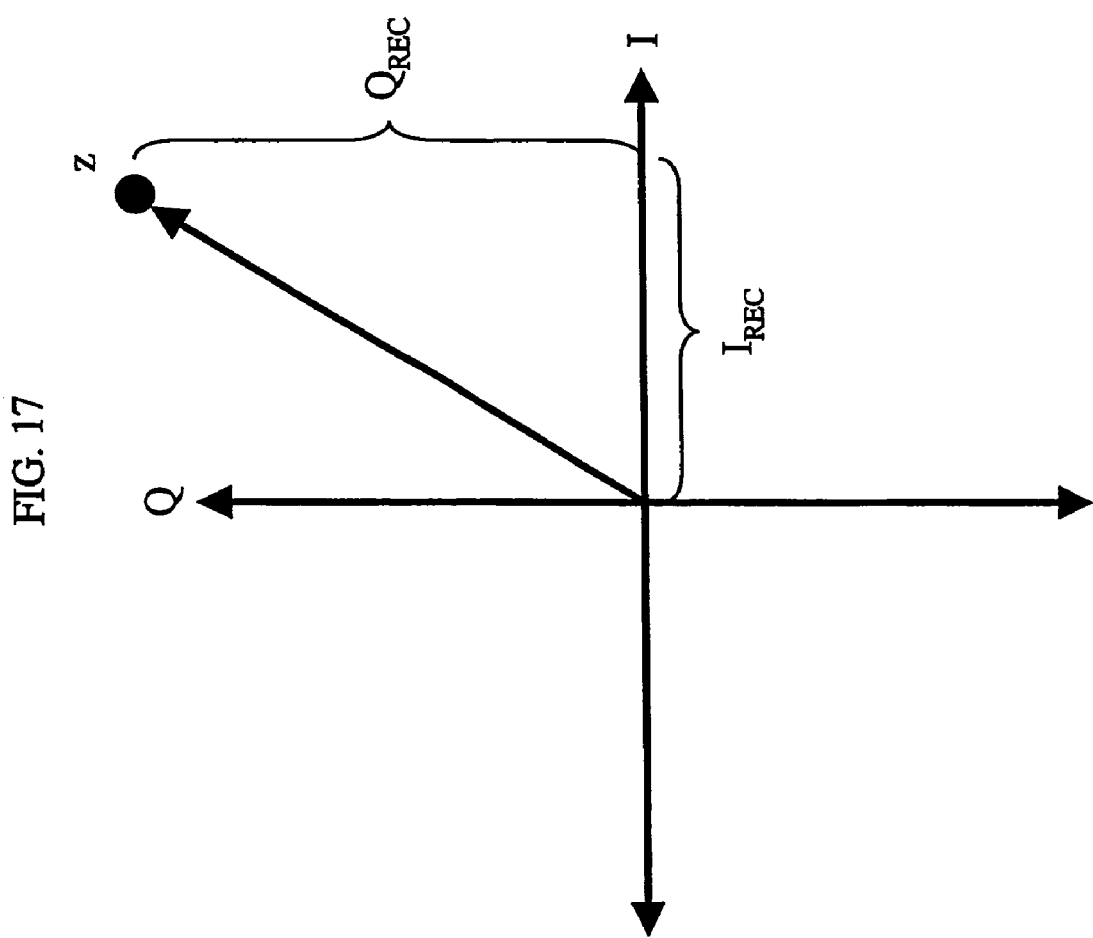
FIG. 17 shows an illustrative signal space.

Attention should now be directed to FIG. 16, which shows an illustrative block diagram of H-L mux 395. The latter comprises multiplexer (mux) 565 and log-likelihood ratio (LLR) look-up table (LUT) 570. The input signals to H-L mux 395 are received signal point values (either from the UL or the LL) and the output signals of H-L mux 395 are soft values representing the probability that certain bits were received. In particular, Mux 565 selects either UL signal point stream 333 or LL signal point stream 391 as a function of demodulation mode signal 389, as described above, and provides the selected signal as received signal 566. As such, received signal 566 is a stream of received signal points, each received signal point having an in-phase ($I_{REC}$) component (572) and a quadrature ($Q_{REC}$) component (571) in a signal space. This is further illustrated in FIG. 17 for a received signal point z, where:

$$z = I_{rec} + jQ_{rec}. \quad (1)$$

Figure 18:
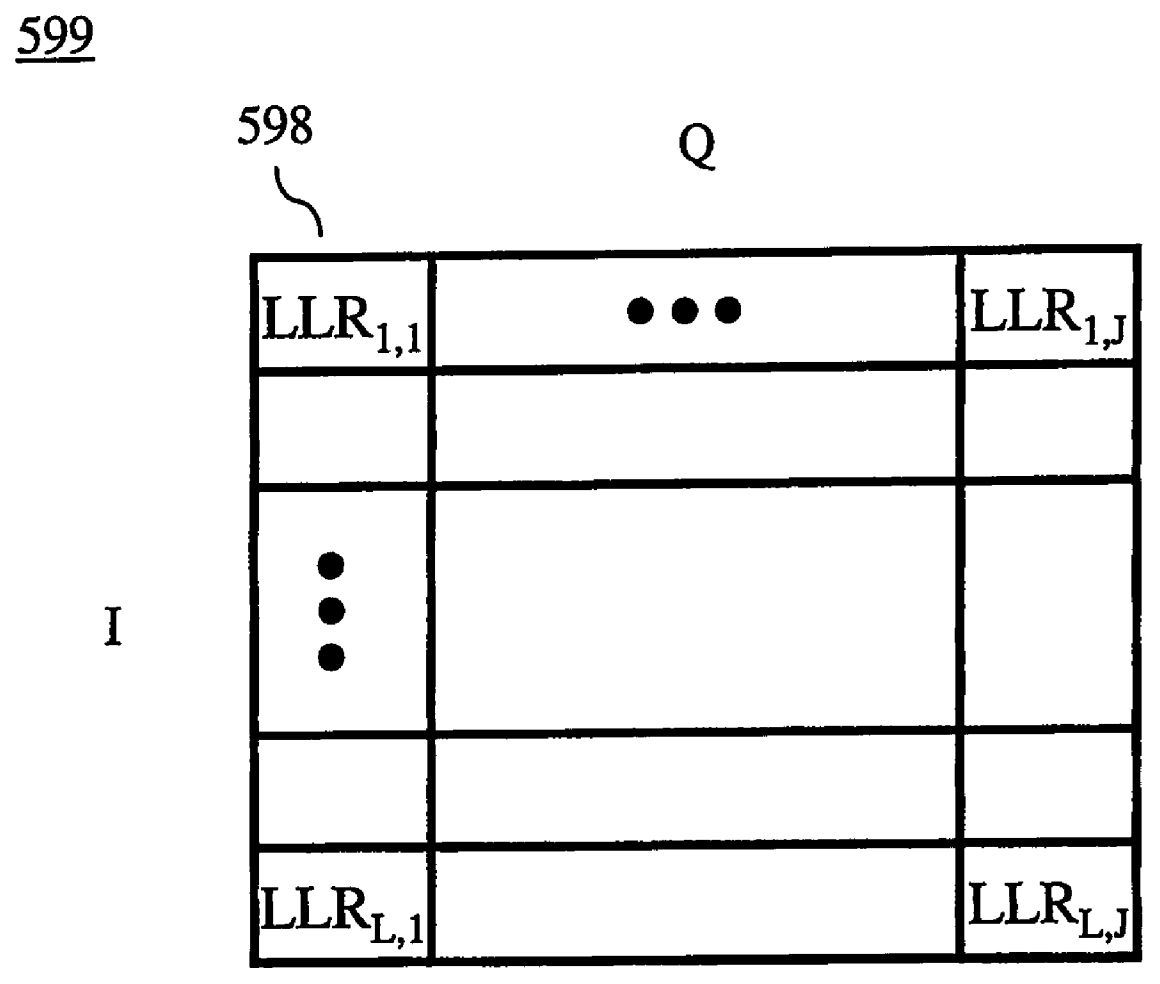

The $I_{REC}$ and $Q_{REC}$ components of each received signal point are applied to LLR LUT 570. The latter stores a LUT 599 of precomputed LLR values as illustrated in FIG. 18. In particular, each row of LUT 599 is associated with a particular I component value (an I row value), while each column of LUT 599 is associated with a particular Q component value (a Q column value). LUT 599 has L rows and J columns. LIR LUT 570 quantizes the $I_{REC}$ and $Q_{REC}$ component values of a received signal point of received signal 566 to form an input address, which is used as an index into LUT 599 for selecting therefrom a respective precomputed LLR. Each symbol interval, T, the selected LLR is provided via signal 396. For example, if the $I_{REC}$ component value of signal 566 is quantized to the first row and the $Q_{REC}$ component value of signal 566 is quantized to the first column, then LLR 598 would be selected and provided via signal 396 of FIG. 16 to metric grouping element 595 of FIG. 11.

Other than the inventive concept, and as known in the art, for a given bit-to-symbol mapping $M(b_i)$, where M are the target symbols and $bi = 0, 1, \ldots B-1$, are the bits to be mapped where B is the number of bits in each symbol (e.g., B may be two bits for QPSK, three bits for 8-PSK, etc.), the log-likelihood ratio function for the ith bit of a B bit value is:

$$LLR(i, z) = \log [(\text{prob}(b_i=1|z))/(\text{prob } (b_i=0|z))]; \quad (2)$$

where $b_i$ is the ith bit and z is the received signal point in the signal space. The notation "prob (bi=1|z)" represents the probability that the ith bit is a "1" given that the signal point z was received. Similarly, the notation "prob (bi=0|z)" represents the probability that the ith bit is a "0" given that the signal point z was received.

For a two-dimensional signal space, the probabilities within equation (2) are assumed to be based upon additive Gaussian white noise (AWGN) having a probability density function (PDF) of:

$$prob(n) = \frac{\exp\left(\frac{-|n|^2}{2\sigma^2}\right)}{2\pi\sigma^2}. \quad (3)$$

Therefore, the LLR for a given bit and received signal point are defined as:

$$LLR(i, z) = \log\left[\frac{\sum_{M_{bit\,1}=1} \exp\left(\frac{-|z-M|^2}{2\sigma^2}\right)}{\sum_{M_{bit\,1}=0} \exp\left(\frac{-|z-M|^2}{2\sigma^2}\right)}\right]. \quad (4)$$

It can be observed from equation (4) that the LLR for a given received signal point z is a function of z, the target symbols M, and the rms noise level σ. An LLR is also one example of a "soft metric."

Figure 19:
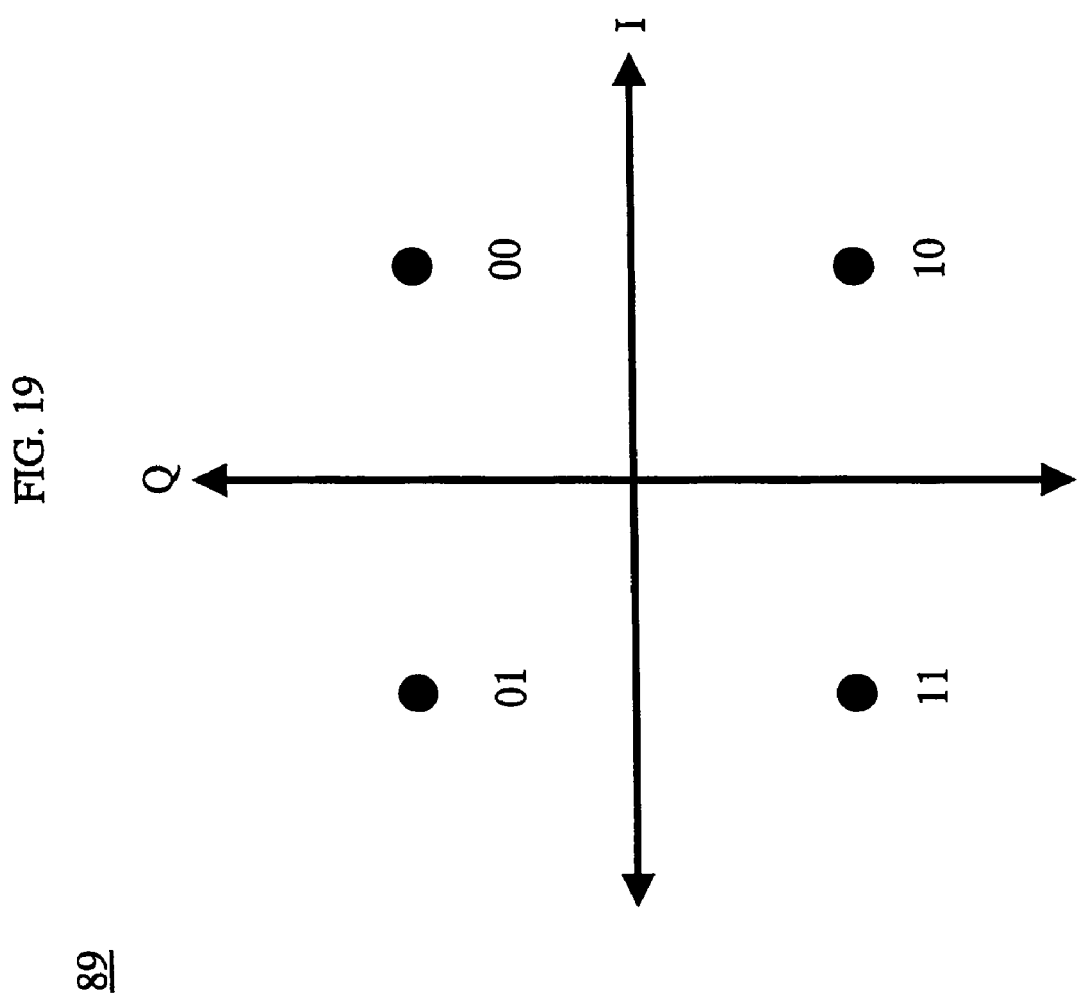
FIG. 19 shows an illustrative symbol constellation.
Figure 20:
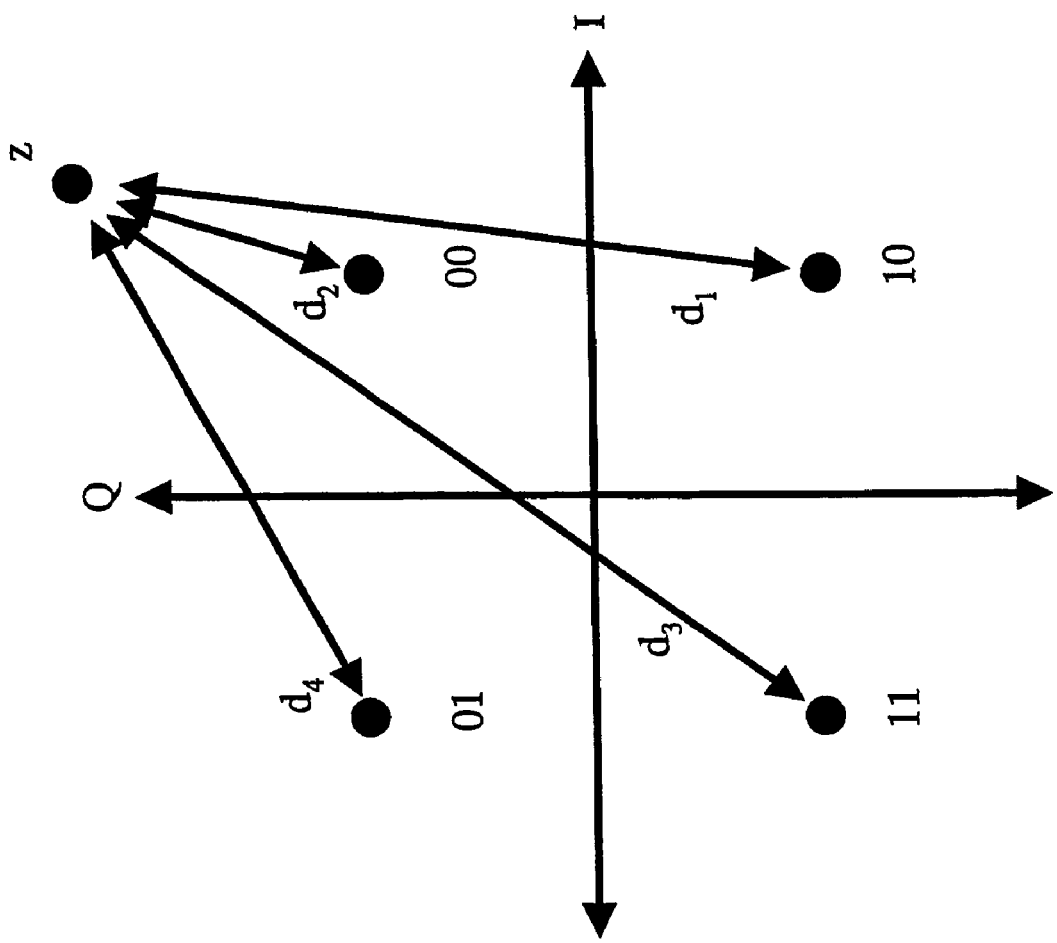
FIGS. 20 and 21 illustrate log-likelihood calculations.

A pictorial illustration of the calculation of an LLR ratio is shown in FIGS. 19 and 20. FIG. 19 shows an illustrative LL symbol constellation. For simplicity a 4 symbol QPSK (quadrature phase shift keyed) constellation is shown, however, it should noted that other sizes and shapes of symbol constellations could also have been used, e.g., 3 bits for 8-PSK, 4 bits for 16-QAM, a hierarchical 16-QAM, etc. As can be observed from FIG. 19, there are four symbols in the signal space 89, each symbol associated with a particular two bit mapping [b1, b0]. Turning now to FIG. 20, a received signal point z is shown in relation to the symbols of signal space 89. It can be observed from FIG. 20 that the received signal point z is located at different distances $d_i$ from each of the symbols of signal space 89. For example, the received signal point z is located a distance $d_4$ from the symbol associated with the two bit mapping "01." As such, the LLRe(b0) is:

ln [(probability b0 is one)/(probability b0 is zero)]; or (5A)

ln [(probability (symbol 01 or 11))/(probability (symbol 00 or 10))]; or (5B)

ln [{exp($-d_4^2/(2\sigma^2)$)+exp($-d_3^2/2\sigma^2$))}/{exp($-d_2^2/(2\sigma^2)$)+exp($-d_1^2/(2\sigma^2)$)}]. (5C)

while the LLR(b1) is:

ln [(probability b1 is one)/(probability b1 is zero)]; or (6A)

ln [(probability (symbol 10 or 11))/(probability(symbol 00 or 01))]; or (6B)

ln [{exp($-d_1^2/(2\sigma^2)$)+exp($-d_3^2/(2\sigma^2)$)}/{exp($-d_2^2/(2\sigma^2)$)+exp($-d_4^2/(2\sigma^2)$)}]. (6C)

Figure 21:
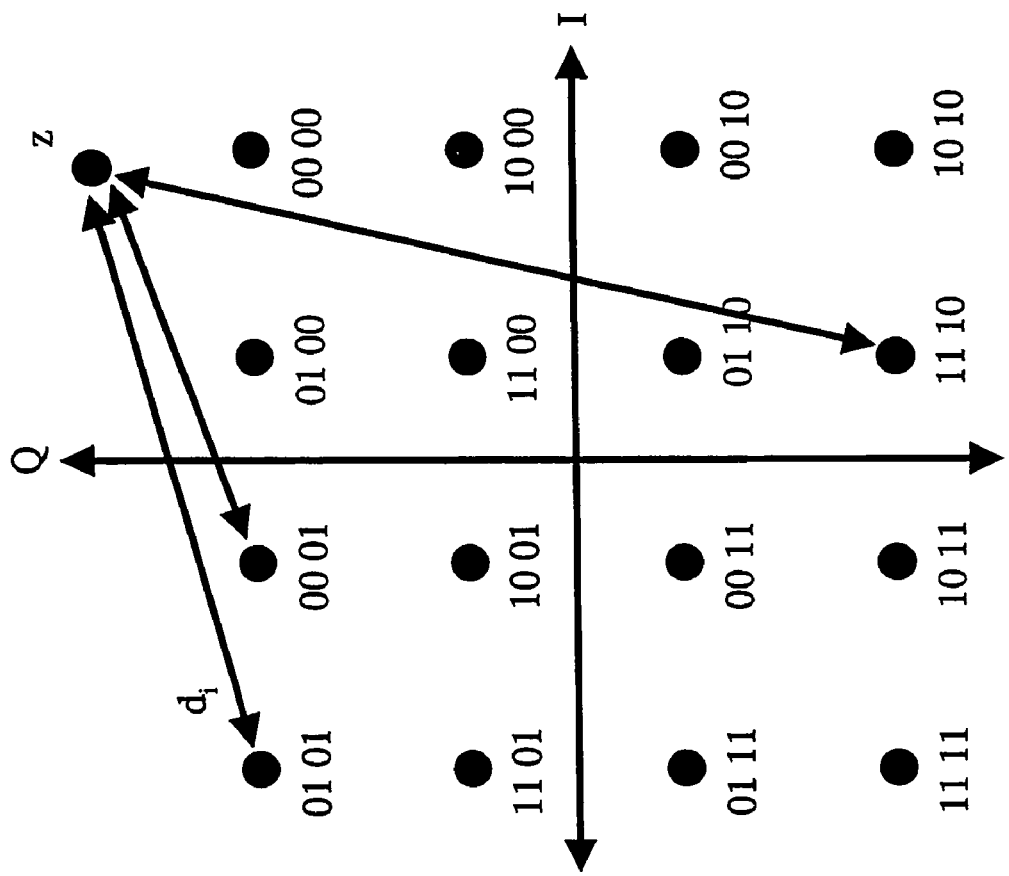

Returning to FIG. 16, it can be observed that LLR LUT 570 (i.e., LUT 599) is initialized to either a set of hierarchical LLR values 573 or layered LLR values 574 depending on the respective mode of receiver 30. For example, the layered TTR values are calculated a priori with respect to a LL symbol constellation such as illustrated in FIGS. 5, 19 and 20; while the hierarchical LLR values are calculated a priori with respect to the combined symbol constellation such as the one illustrated in FIG. 7 and shown again in FIG. 21. In other words, the hierarchical LLRs for the LL are determined—not with respect to the LL signal space (e.g., signal space 89 of FIG. 5)—but with respect to the combined signal space (e.g., signal space 79 of FIG. 7). For every received signal point z, a distance between each symbol of signal space 79 and the received signal point z is determined and used in calculating an LLR. For simplicity, only some of these distances, $d_i$, are shown in FIG. 21. The hierarchical LLR values 573 and the layered LLR values 574 can be formed in any number of ways. For example, receiver 30 may perform the calculations by using, e.g., a training signal, provided by transmitter 5 either during start-up, or re-initialization, of communications between the two endpoints (transmitter 5 and receiver 30). As known in the art, a training signal is a predefined signal, e.g., a predefined symbol sequence that is known a priori to the receiver. A predefined "handshaking" sequence may further be defined, where the endpoints exchange signaling before communicating data therebetween. Alternatively, the calculations may be performed remotely, e.g., at the location of transmitter 5 and sent to receiver 30 via an in-band or out-of-band signaling channel (this could even be via a dial-up facility (wired and/or wireless) (not shown)). Or, the LLR values can be calculated based on expected signal conditions, and stored in the receiver at the time of manufacture.

Figure 22:
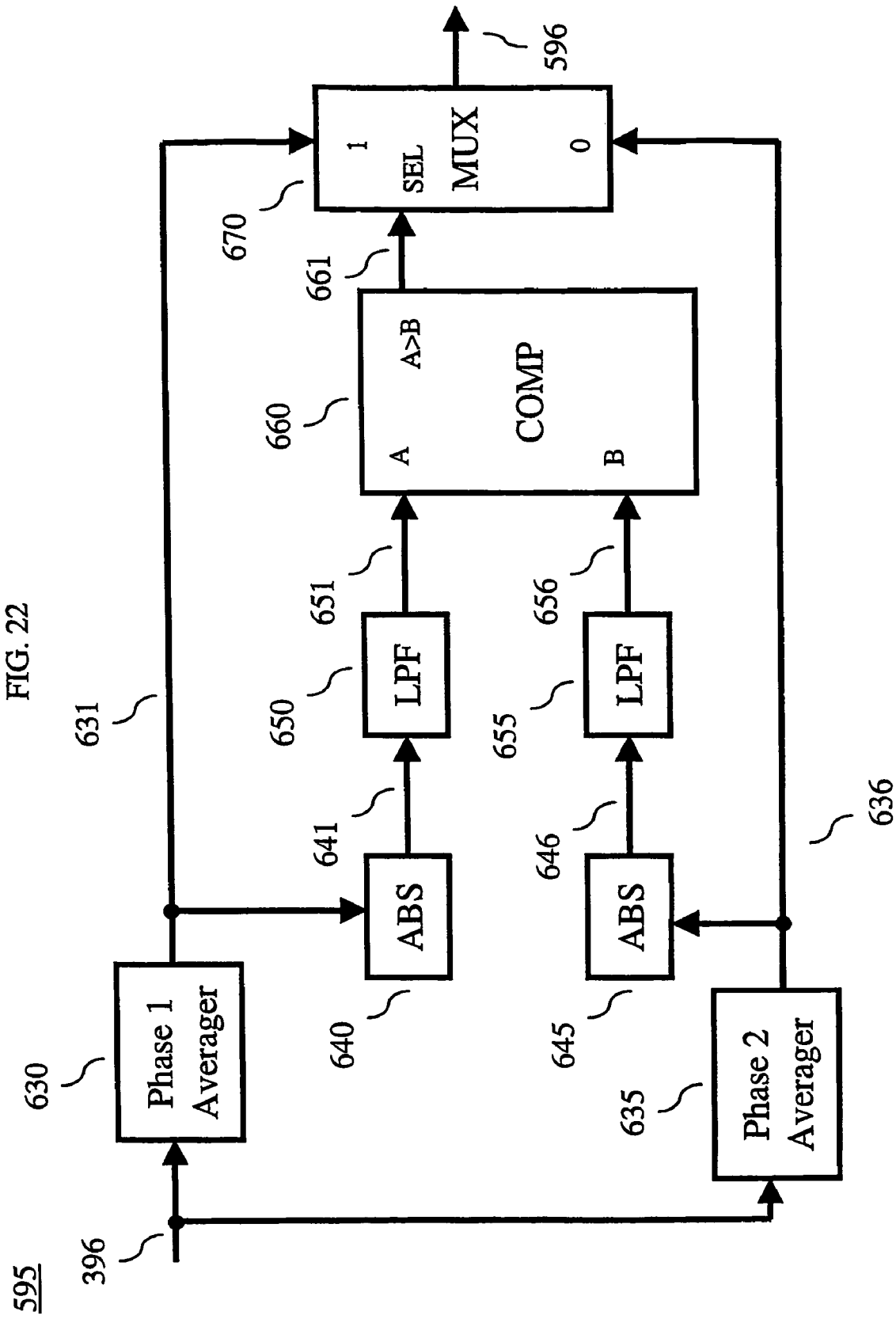
FIG. 22 shows an embodiment of metric grouping element 595 of FIG. 11.

Referring back to FIG. 11, in accordance with the principles of the invention metric grouping element 595 receives the sequence of LLRs (the soft input data), via signal 396, and provides therefrom repetition decoded signal 596. Mustratively, metric grouping element 595 performs the functions of aligning the repetition symbols with symbols and providing an LLR output value for each repetition symbol, as described below and illustrated in FIG. 22. For illustrative purposes, metric grouping element 595 is shown for the case J=2, although J can be any number greater than one. Metric grouping element 595 comprises phase averagers 630 and 635, absolute value elements 640 and 645, low-pass filters 650 and 655, comparator 660 and multiplexer 670.

The first function performed by metric group element 595 is, in effect, alignment of the received signal point sequence in the LL to a repetition symbol period. As noted earlier, each transmitted LL repetition symbol includes J symbols, where J>1. In this regard, metric grouping element 595 processes the sequence of LLRs (represented by signal 396) to group those associated with the same repetition symbol period. This alignment, or grouping, can be performed in any number of ways. Here, Phase 1 Averager 630 takes LLR values 396 as input, and provides output LLR values averaged over each repetition symbol (LLR0+LLR1), (LLR2+LLR3) . . . as signal 631, while Phase 2 Averager 635 takes LLR values 396 as input, and provides output LLR values averaged over each repetition symbol with another alignment (LLR1+LLR2), (LLR3+LLR4) . . . as signal 636. Signal 631 is further processed by absolute value element 640 to provide absolute values signal 641, which is further processed by low-pass filter (LPF) 650 to provide filtered signal 651. Signal 636 is further processed by absolute value element 645 to provide absolute values signal 646, which is further processed by low-pass filter (LPF) 655 to provide filtered signal 656. Comparator 660 receives the low-pass filtered signals 651 and 656 and creates select signal 661, which is one if signal 651 is greater than signal 656, indicating that Phase 1 is a better alignment, or zero otherwise, indicating that Phase 2 is a better alignment. The select signal 661 is applied to multiplexer (MUX) 670, which then passes the averaged repetition symbol LLR values according to the determined better alignment: that is, it selects signal 631, corresponding to Phase 1, if the select signal 661 is a one or signal 636, if the select signal 661 is a zero, to provide LLR output 596. Thus, metric grouping element 595 passes the summed LLRs associated with the best alignment phase as the combination metric and provides this average LLR every repetition symbol period to LL decoder 340 as repetition decoded signal 596. Thus, group metric element 595, in effect, removes the duplicated data from the LL signal.

LL decoder 340 receives the sequence of average LLRs (the soft input data), via signal 596, and provides therefrom LL signal 321-2. LL decoder 340 operates in a complementary fashion to that of LL encoder 10. It should also be noted that LL decoder 340 may also be a soft-input-soft-output decoder, and provide soft output values, which are then additionally processed (not shown) to form LL signal 321-2.

It can be observed from FIG. 11 that in a layered demodulation mode receiver 30 sequentially demodulates the received signal by first recovering the UL signal via UL demodulator 330 and decoder 335. The recovered UL signal is then reencoded and remodulated for subtraction from the received signal to uncover the LL signal for demodulation by LL demodulator 390. The resulting demodulated LL signal point stream 391 is then processed to generate soft input data, e.g., LLRs, with respect to the LL symbol constellation. In contrast, in a hierarchical demodulation mode, the UL signal point stream 333 is recovered, from which the LL, signal is then directly determined. This is referred to herein as a simultaneous mode of decoding. In particular, the UL signal point stream 333 is processed to generate soft input data, e.g., LLRs, to recover therefrom the LL data.

Figure 23:
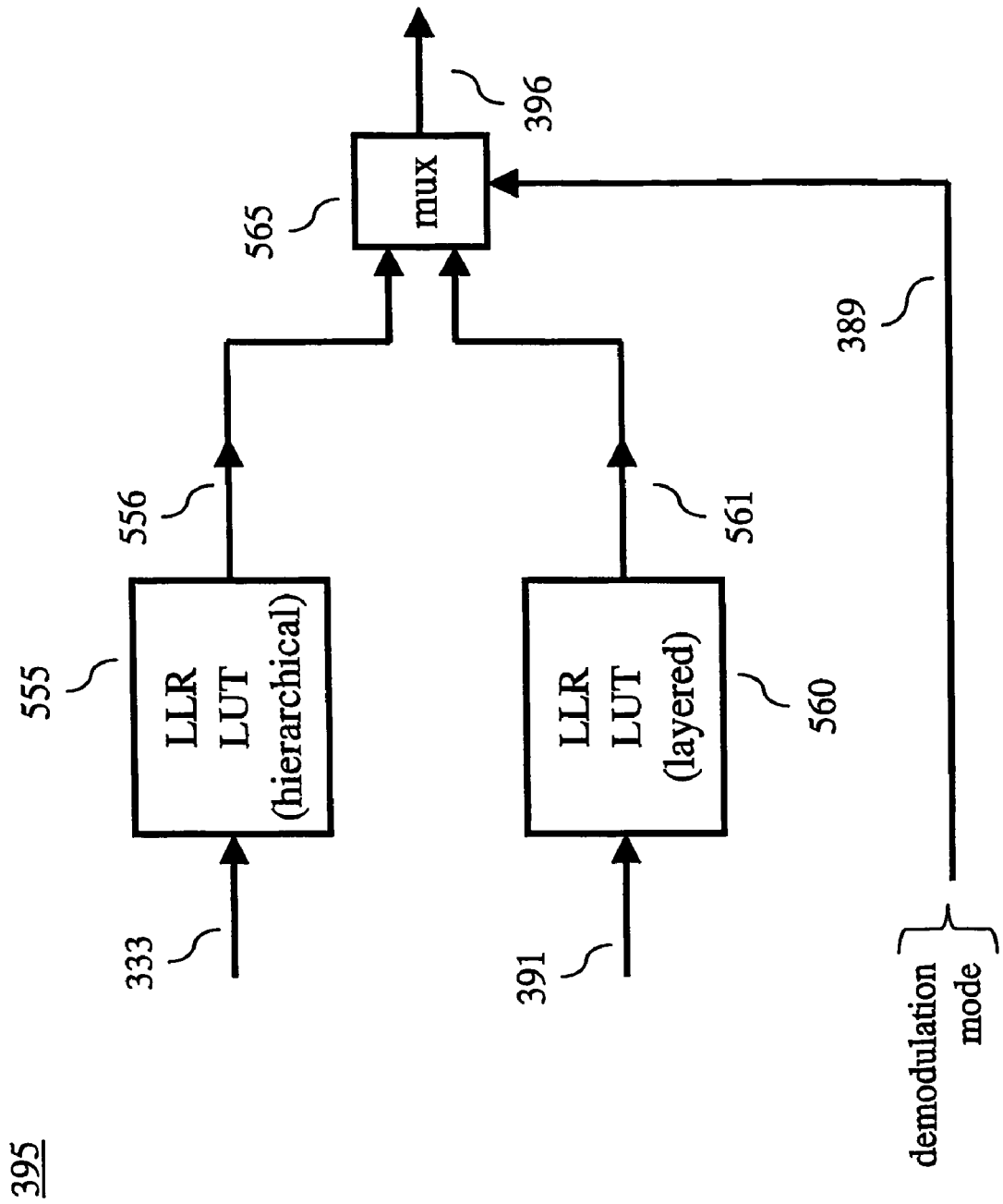
FIG. 23 shows another variation of H-L mux 395 of FIG. 11.

Other variations of H-L mux 395 are possible. For example, FIG. 23 shows an illustration where two separate look-up tables (555 and 560) are located in front of mux 565, which selects the appropriate signal (either signal 556 or 561) in accordance with demodulation mode signal 389.

Figure 24:
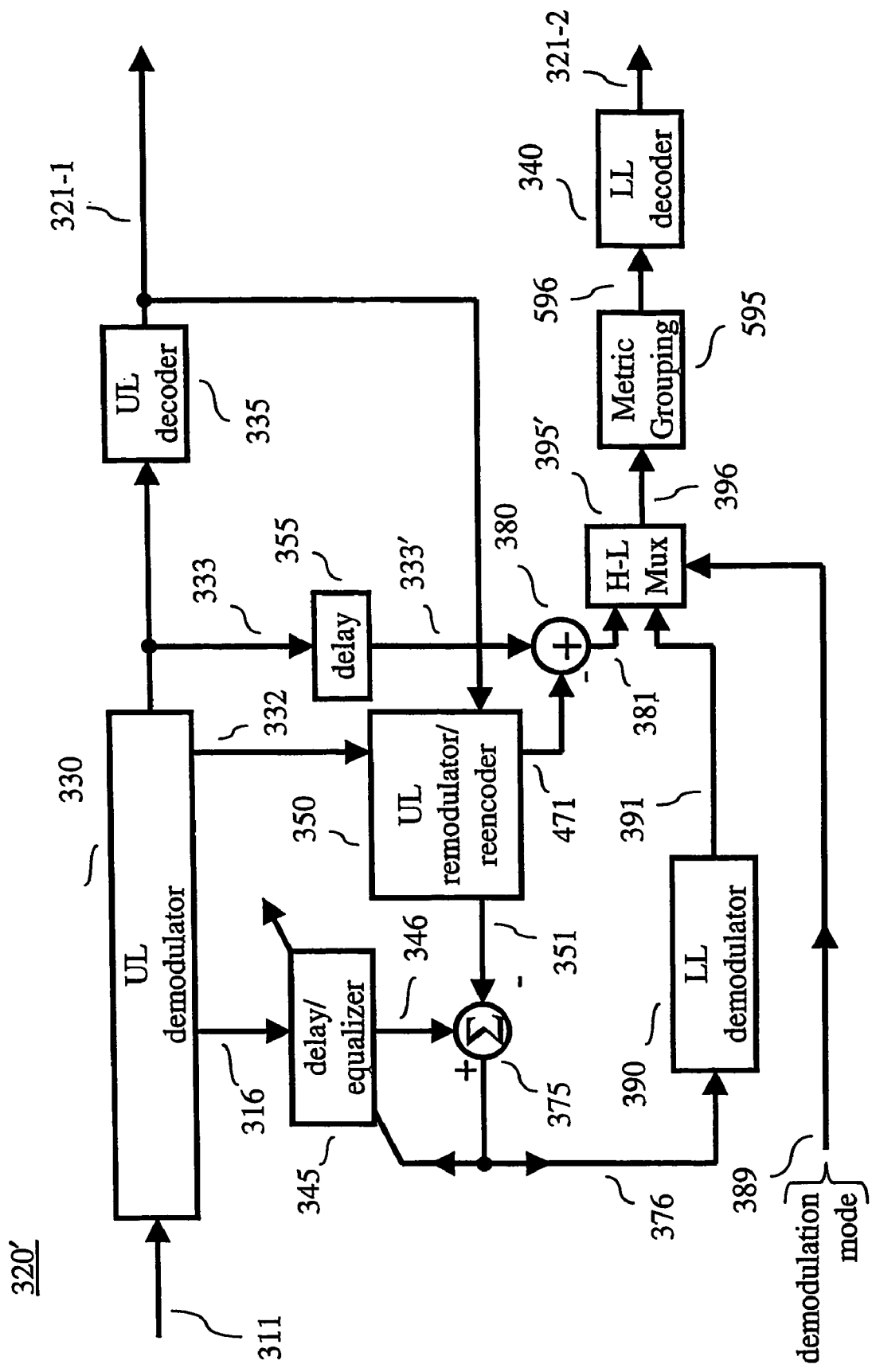
FIGS. 24-25 show other illustrative embodiments of a unified demodulator/decoder in accordance with the principles of the invention.

Another embodiment in accordance with the principles of the invention is shown in FIG. 24. Illustratively, in this embodiment a unified demodulator/decoder 320' sequentially decodes the received signal when in the hierarchical mode of operation. For sequential decoding of a hierarchical modulation based signal, the receiver first decodes the UL signal and then decodes the LL signal. As can be observed from FIG. 24, unified demodulator/decoder 320' is similar to unified demodulator/decoder 320 of FIG. 11 except for the addition of combiner, or adder 380, delay element 355 and H-L mux 395'. Delay element 355 compensates for the processing delay of UL decoder 335, encoder 470, etc. Illustratively, adder 380 receives as input signals the delayed demodulated UL signal point stream 333' and signal 471, which is available from UL remodulator/reencoder 350 as shown in FIG. 13. Combiner 380 subtracts the encoded signal 471 from delayed demodulated UL signal point stream 333' to provide an LL signal point stream 381 to an input of H-L mux 395'. As before, H-L mux 395' selects the applied signals, here, either LL signal point stream 381 or the demodulated LL signal point stream 391 as a function of the selected demodulation mode.

Figure 25:
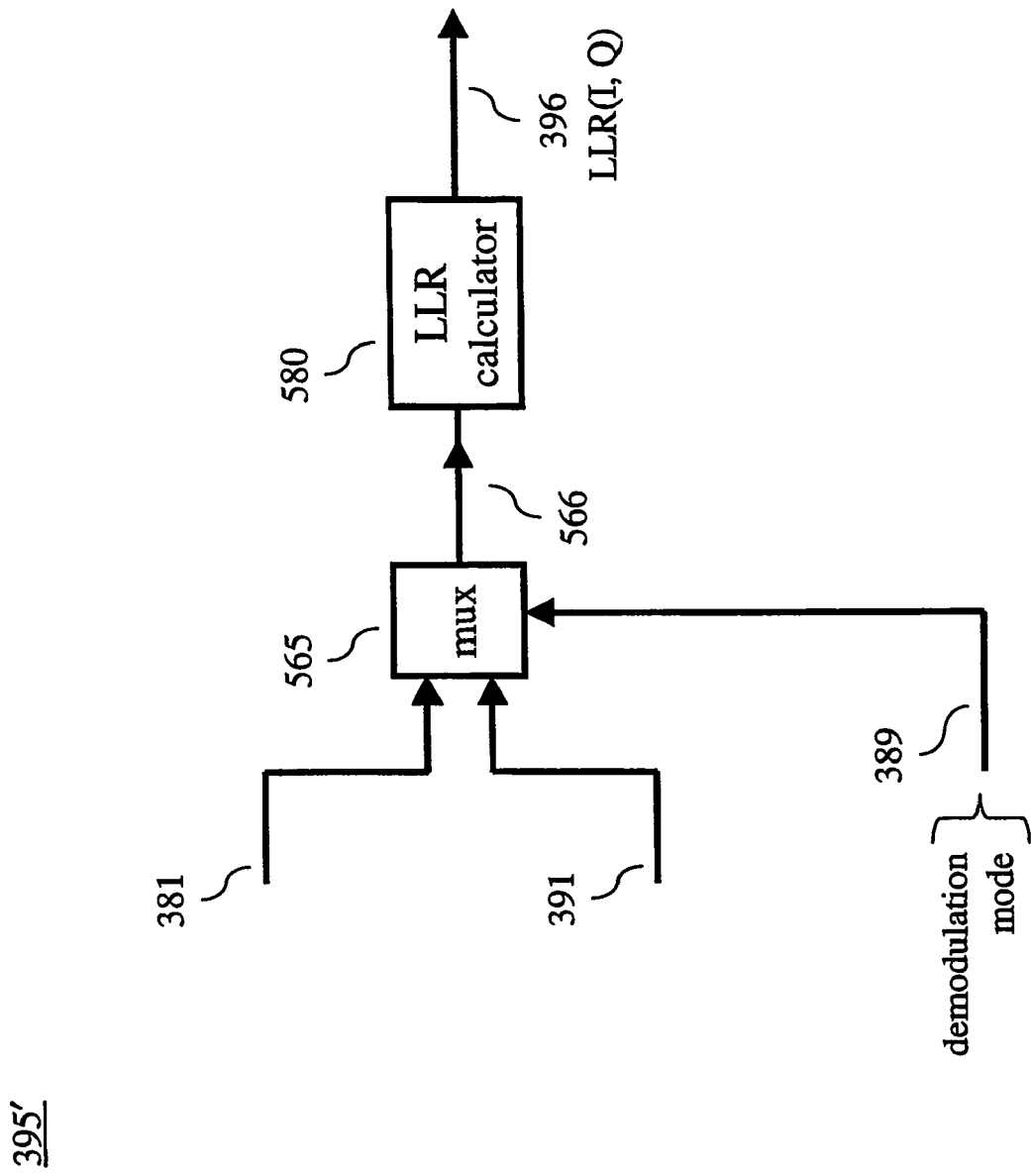

A block diagram of H-L mux 395' is shown in FIG. 25. In this example, H-L mux 395' includes mux 565 and LLR calculator 580. Mux 565 selects between LL signal point stream 381 or the demodulated LL signal point stream 391 as a function of demodulation mode signal 389 to provide received signal point stream 566. The latter is applied to a soft data generator, such as represented by LLR calculator 580, which provides LLR data 396 to group metric element 595, as described above.

Figure 26:
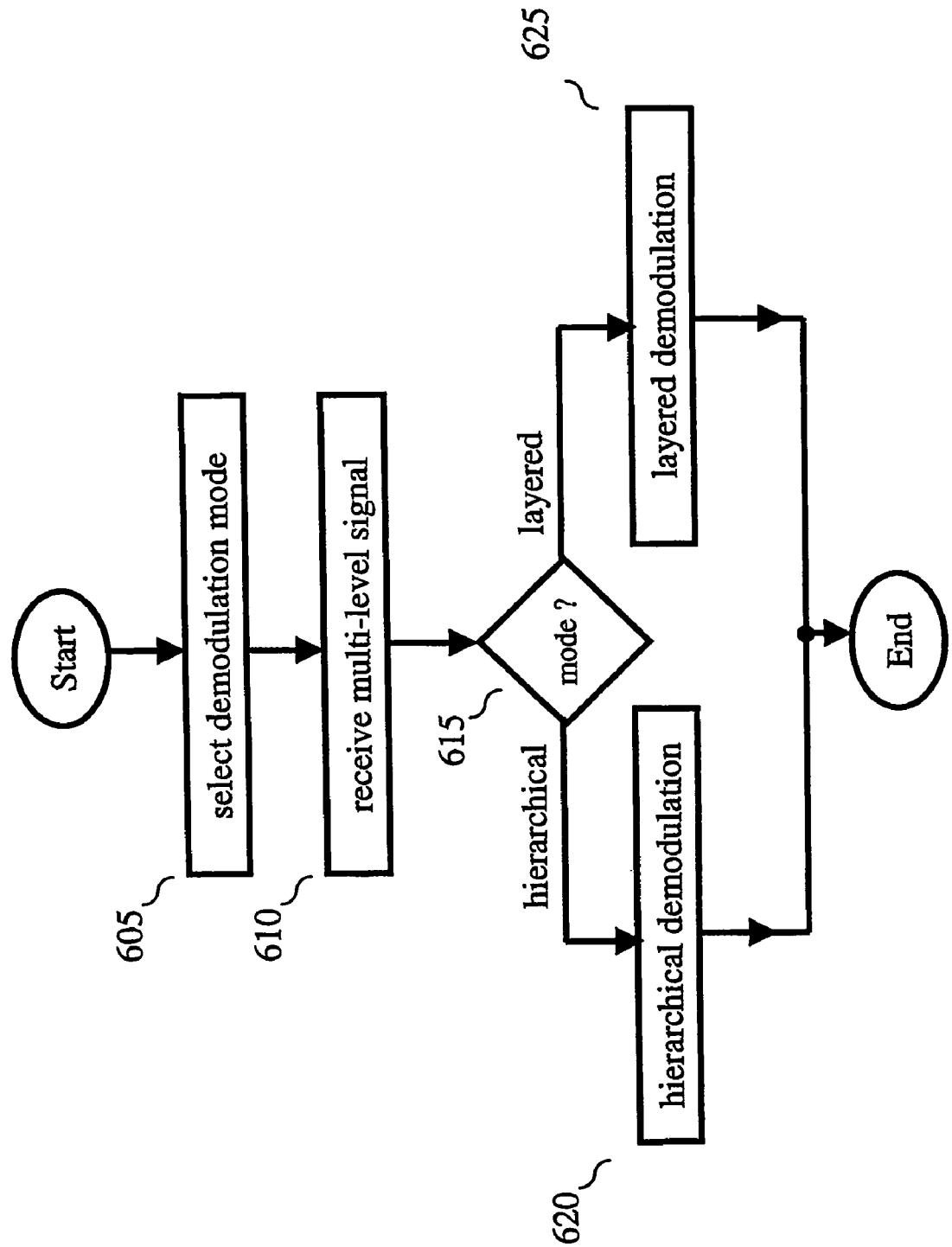
FIG. 26 shows an illustrative flow chart in accordance with the principles of the invention.

Attention should now be directed to FIG. 26, for use in receiver 30 of FIG. 1. In step 605, receiver 30 selects a one of a number of demodulation modes. Illustratively, there are at least two demodulation modes: hierarchical demodulation and layered demodulation. As noted above, this selection can be performed by, e.g., a jumper setting, a configuration screen (not shown) of receiver 30, or from data transmitted on an out-of-band or an in-band signaling channel. In step 610, receiver 30 receives a multi-level signal. In step 615, receiver 30 determines the demodulation process to perform as a function of the selected demodulation mode. If the demodulation mode is hierarchical, then receiver 30 performs hierarchical demodulation of the received multi-level signal in step 620. On the other hand, if the mode of demodulation is layered, then receiver 30 performs layered demodulation of the received multi-level signal in step 625. It should be noted that selection of the demodulation mode (step 605) may be performed after receiving the multi-level signal (step 610).

Figure 27:
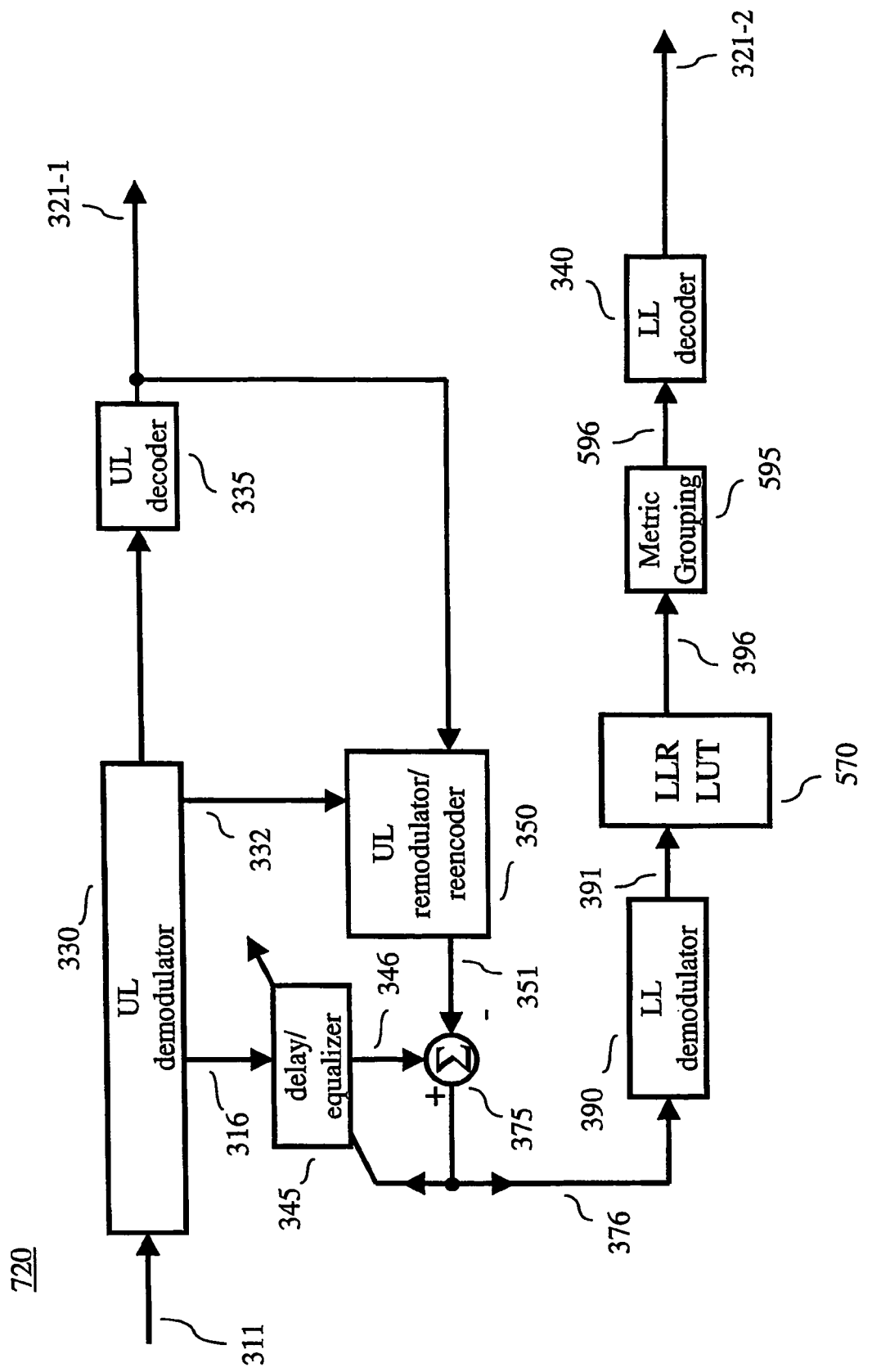
FIG. 27 shows another illustrative embodiment of a layered modulation receiver in accordance with the principles of the invention.

Another embodiment of a receiver in accordance with the principles of the invention is shown in FIG. 27. Illustratively, in this embodiment receiver 30 (not shown) only performs layered demodulation and includes demodulator/decoder 720 for sequentially decoding a received signal. As can be observed from FIG. 27, demodulator/decoder 720 is similar to unified demodulator/decoder 320 of FIG. 11 except for the deletion of a number of elements since hierarchical demodulation is not supported.

Illustratively, received signal point stream 391 is applied to LLR lookup table 570 which provides LLR values 396 to metric grouping element 595. With respect to alignment, metric grouping element 595 again aligns the received signal points by creating combined LLR values for each of J possible alignments, and selects the best sequence of combined LLR values as that having, on average, the highest absolute value. As such, metric grouping element 595 then provides a repetition decoded signal 596 for application to LL decoder 340. In this context, LL decoder 340 receives LLR values.

Figure 28:
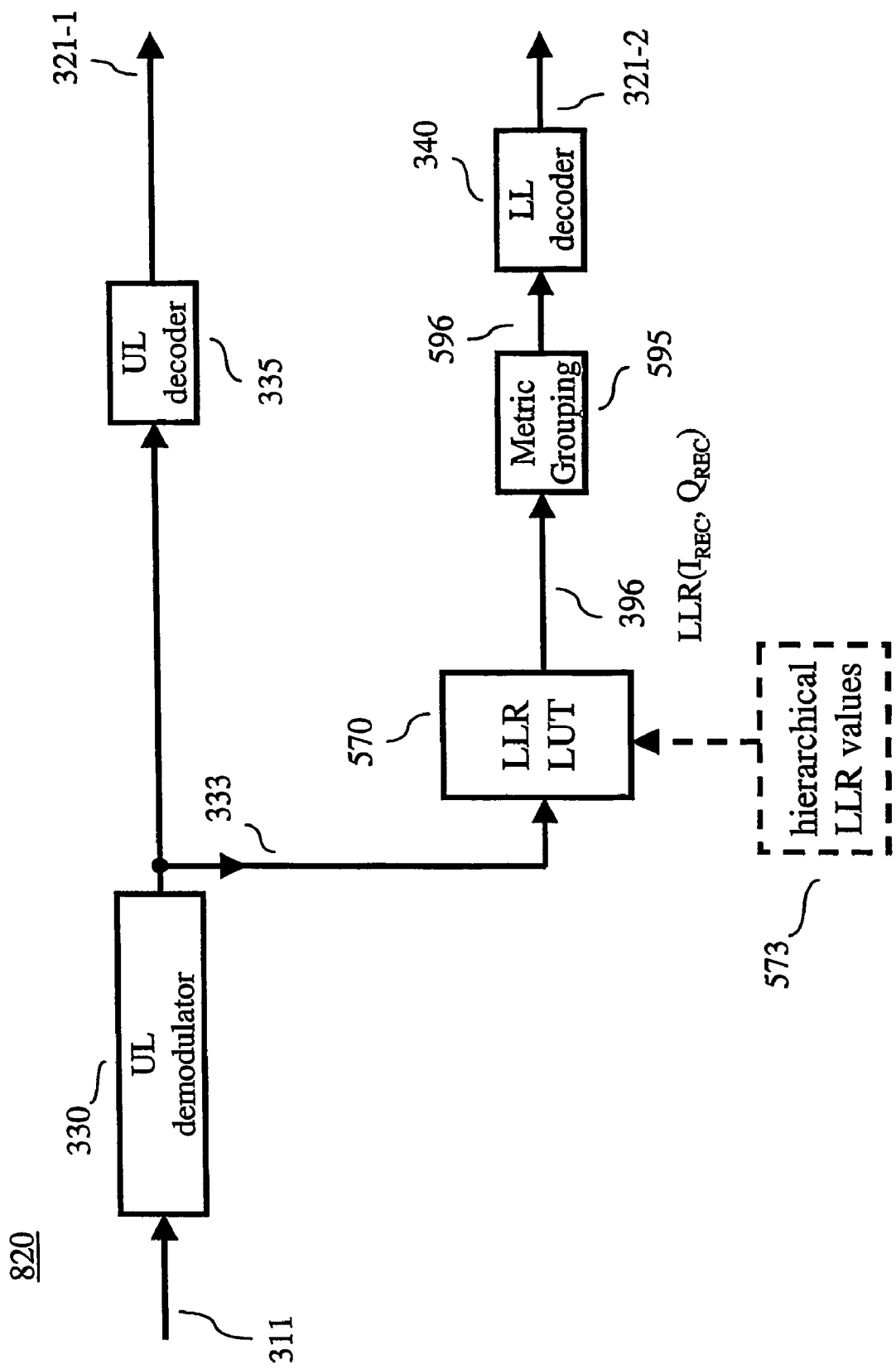
FIG. 28 shows another illustrative embodiment of a hierarchical modulation receiver with simultaneous decoding in accordance with the principles of the invention.

Another embodiment of a receiver in accordance with the principles of the invention is shown in FIG. 28. Illustratively, in this embodiment receiver 30 (not shown) only performs hierarchical demodulation and includes demodulator/decoder 820 for simultaneously decoding a received signal. As can be observed from FIG. 28, demodulator/decoder 820 is similar to unified demodulator/decoder 320 of FIG. 11 except for the deletion of a number of elements since layered demodulation is not supported. As can be observed from FIG. 28, UL signal point stream 333 is applied to LLR LUT 570, which has stored therein hierarchical LLR values 573, as described above. The resulting stream of LLRs (signal 396) is applied to metric grouping element 595 as described earlier.

Figure 29:
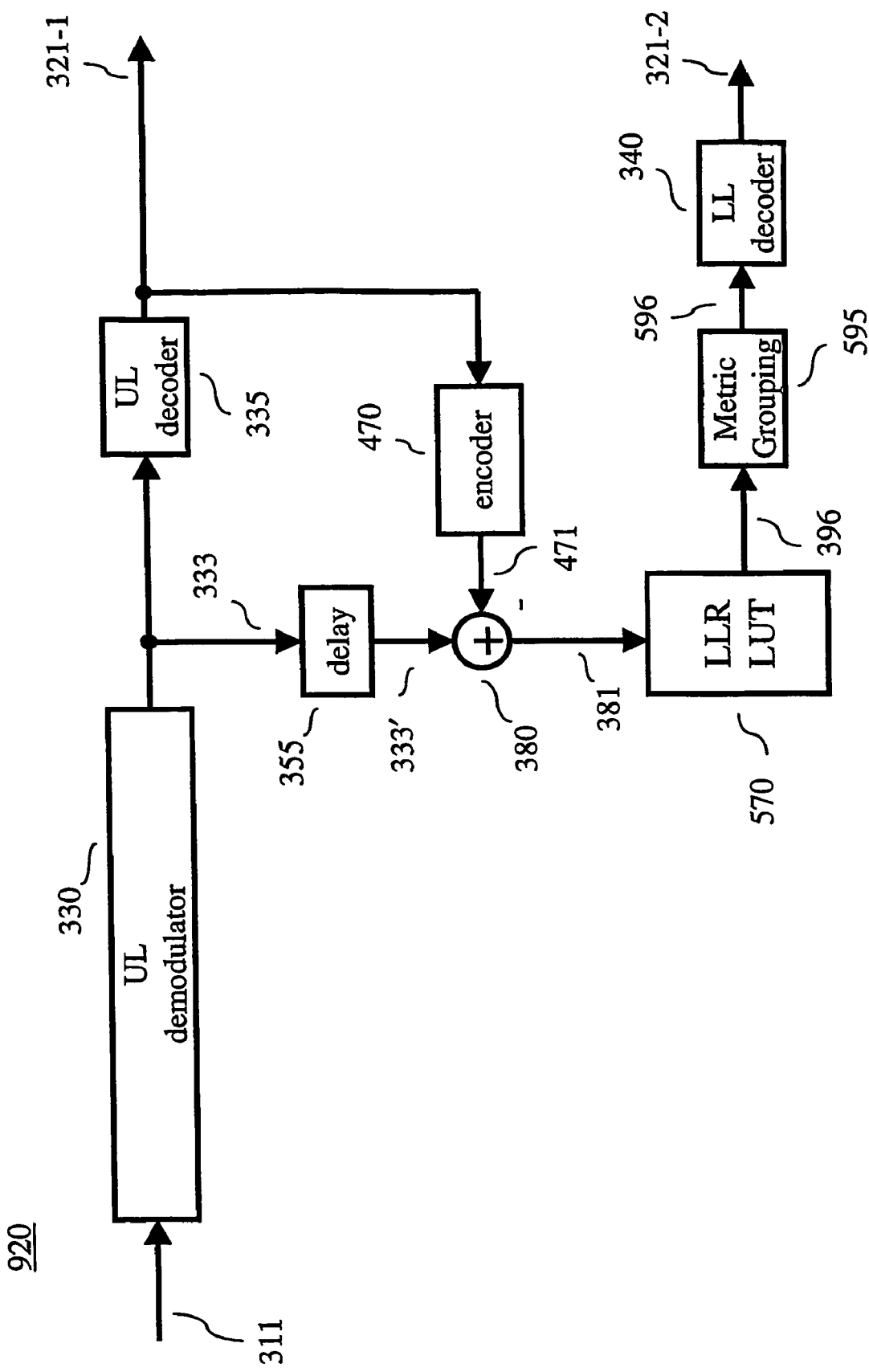
FIG. 29 shows another illustrative embodiment of a hierarchical modulation receiver with sequential decoding in accordance with the principles of the invention.

Another embodiment of a receiver in accordance with the principles of the invention is shown in FIG. 29. Illustratively, in this embodiment receiver 30 (not shown) only performs hierarchical demodulation and includes demodulator/decoder 920 for sequentially decoding a received signal. As can be observed from FIG. 29, demodulator/decoder 920 is similar to unified demodulator/decoder 320' of FIGS. 24 and 25 except for the deletion of a number of elements since layered demodulation is not supported. Comments similar to those made with respect to the other embodiments apply here, e.g., LL decoder 340 receives LLR values.

It should be noted that metric grouping element 595 can, in alternative embodiments, operate upon symbol values, aligning and averaging them, in which case, for example, a LL decoder may first convert averaged symbol values into LLR values for subsequent decoding.

In accordance with a feature of the invention, the use of a repetition coder provides the ability to derive codes with additional design flexibility. For example, a rate ½ coder can be implemented by LL encoder 10 of FIG. 3. As known in the art, the nomenclature "rate ½" means that for every two bits transmitted, one bit is redundant (i.e., provides for error protection/detection). In general form, a coder can be stated to have a rate n/R, where n and R are greater than one and R>n. Further, in practice LL encoder 10 may be derived from an existing encoder design (proprietary or off-the shelf). Yet by adding repetition coding, transmitter 5 effectively implements a rate $n/((R)(J))$ coder—without requiring a redesign in the encoder or corresponding decoder—thus saving money and design time. It should also be noted that repetition coding as described herein can also be used in conjunction with puncturing and other techniques to derive classes of code rates that are usually not available otherwise.

As described above, and in accordance with the inventive concept, repetition coding is used on at least one level of a multi-level signal. Indeed, the inventive concept in effect creates a more robust LL channel that allows recovery of data conveyed on the LL channel in lower SNR environments. Indeed, use of repetition coding on, e.g., the lower layer, improves receiver performance without increasing the power level of the lower layer channel. As such, although described in the context of repetition coding on a lower layer signal, the invention is not so limited and may be applied to any one or more layers of a multi-level modulated signal. Also, It should be noted that although described in the context of a receiver coupled to a display as represented by TV 35, the inventive concept is not so limited. For example, receiver 30 may be located further upstream in a distribution system, e.g., at a head-end, which then retransmits the content to other nodes and/or receivers of a network. Further, although hierarchical modulation and layered modulation were described in the context of providing communication systems that are backward compatible, this is not a requirement of the inventive concept. It should also be noted that groupings of components for particular elements described and shown herein are merely illustrative. For example, either or both UL decoder 335 and LL decoder 340 may be external to element 320, which then is essentially a demodulator that provides at least a demodulated upper layer signal and a demodulated lower layer signal. Likewise, it should be noted that although shown as a separate element, the functionality of repetition coder 170 can also be implemented in other elements of the figures. Consider for example, FIG. 3, the repetition coding function could be included within LL encoder 110 or LL modulator 120. Similar comments apply to the other figures.

As such, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied on one or more integrated circuits (ICs). Similarly, although shown as separate elements, any or all of the elements may be implemented in a stored-programcontrolled processor, e.g., a digital signal processor (DSP) or microprocessor that executes associated software, e.g., corresponding to one or more of the steps shown in FIG. 26. Further, although shown as separate elements, the elements therein may be distributed in different units in any combination thereof. For example, receiver 30 may be a part of TV 35. It is therefore to be understood that numerous modifications may be made to the illustrative embodiments and that other arrangements may be devised without departing from the spirit and scope of the present invention as defined by the appended claims.

The invention claimed is:

1. A receiver comprising:
   a demodulator for demodulating a multi-level received signal to provide K demodulated signals, where K>1; and
   a repetition decoder for removing duplicated data from at least one of the K demodulated signals;
   wherein the multi-level received signal is a layered modulated signal including at least an upper layer and a lower layer; and
   wherein the repetition decoder provides a repetition decoded signal and wherein the receiver further comprises a decoder for decoding the repetition decoded signal.

2. The receiver of claim 1, wherein the repetition decoder operates on the lower layer.

3. The receiver of claim 1, wherein the repetition decoded signal represents an average log-likelihood ratio (LLR) for every J received signal points of the at least one demodulated signal, where J>1.

4. The receiver of claim 1, wherein the repetition decoded signal represents an average of every J received signal points of the at least one demodulated signal, where J>1.

5. The receiver of claim 1, wherein the repetition decoder further comprises:
   a number of averaging elements, each averaging element averaging soft input data derived from the at least one demodulated signal over a different respective alignment and providing a respective averaged signal;
   a comparator for determining which averaged signal represents a better alignment as compared to the remaining averaged signals; and
   a selector for providing the averaged signal determined to represent the better alignment.

6. The receiver of claim 5, wherein the soft input data is a function of log-likelihood ratio (LLR) values associated with the at least one demodulated signal.

7. A receiver comprising:
   a demodulator for demodulating a multi-level received signal to provide K demodulated signals, where K>1; and
   a repetition decoder for removing duplicated data from at least one of the K demodulated signals;
   wherein the demodulator has a number of operating modes, wherein at least two of the modes are a hierarchical mode and a layered mode; and
   wherein the repetition decoder provides a repetition decoded signal and wherein the receiver further comprises a decoder for decoding the repetition decoded signal.

8. The receiver of claim 7, wherein the multi-level received signal is a hierarchically modulated signal including at least an upper layer and a lower layer.

9. The receiver of claim 8, wherein the repetition decoder operates on the lower layer.

10. The receiver of claim 7, wherein the multi-level received signal is a layered modulated signal including at least an upper layer and a lower layer.

11. The receiver of claim 10, wherein the repetition decoder operates on the lower layer.

12. The receiver of claim 7, wherein the repetition decoded signal represents an average log-likelihood ratio (LLR) for every J received signal points of the at least one demodulated signal, where J>1.

13. The receiver of claim 7, wherein the repetition decoded signal represents an average of every J received signal points of the at least one demodulated signal, where J>1.

14. The receiver of claim 7, wherein the repetition decoder further comprises:
   a number of averaging elements, each averaging element averaging soft input data derived from the at least one demodulated signal over a different respective alignment and providing a respective averaged signal;
   a comparator for determining which averaged signal represents a better alignment as compared to the remaining averaged signals; and
   a selector for providing the averaged signal determined to represent the better alignment.

15. The receiver of claim 14, wherein the soft input data is a function of log-likelihood ratio (LLR) values associated with the at least one demodulated signal.

16. A receiver comprising:
   a demodulator for demodulating a multi-level received signal to provide K demodulated signals, where K>1; and
   a repetition decoder for removing duplicated data from at least one of the K demodulated signals; wherein the repetition decoder further comprises
      a number of averaging elements, each averaging element averaging soft input data derived from the at least one demodulated signal over a different respective alignment and providing a respective averaged signal;
      a comparator for determining which averaged signal represents a better alignment as compared to the remaining averaged signals; and
      a selector for providing the averaged signal determined to represent the better alignment.

17. The receiver of claim 16, wherein the soft input data is a function of log-likelihood ratio (LLR) values associated with the at least one demodulated signal.

18. A method for use in a receiving apparatus, the method comprising:
   using the receiving apparatus to perform the steps of:
   demodulating a multi-level received signal to provide K demodulated signals, where K>1; and
   removing duplicated data from at least one of the K demodulated signals; and
   wherein the multi-level received signal is a layered modulated signal including at least an upper layer and a lower layer; and
   wherein the removing step includes the step of providing a repetition decoded signal and the method further comprises the step of decoding the repetition decoded signal.

19. The method of claim 18, wherein the repetition decoder operates on the lower layer.

20. The method of claim 18, wherein the repetition decoded signal represents an average log-likelihood ratio (LLR) for every J received signal points of the at least one demodulated signal, where J>1.

21. The method of claim 18, wherein the repetition decoded signal represents an average of every J received signal points of the at least one demodulated signal, where J>1.

22. The method of claim 18, wherein the removing step comprises:
   averaging soft input data derived from the at least one demodulated signal over a number of different alignments and providing a respective averaged signal associated with each alignment;

determining which averaged signal represents a better alignment as compared to the remaining averaged signals; and providing that averaged signal determined to represent the better alignment.

23. The method of claim 22, wherein the soft input data is a function of log-likelihood ratio (LLR) values associated with the at least one demodulated signal.

24. A method for use in a receiving apparatus, the method comprising:

using the receiving apparatus to perform the steps of:

demodulating a multi-level received signal to provide K demodulated signals, where K>1; and removing duplicated data from at least one of the K demodulated signals;

wherein the demodulating step includes the steps of:

selecting one of at least two demodulation modes; and performing the demodulation in accordance with the selected mode; and wherein the at least two demodulation modes is a hierarchical demodulation mode and a layered demodulation mode.

25. The method of claim 24, wherein the multi-level received signal is a hierarchically modulated signal including at least an upper layer and a lower layer.

26. The method of claim 25, wherein the repetition decoder operates on the lower layer.

27. The method of claim 24, wherein the multi-level received signal is a layered modulated signal including at least an upper layer and a lower layer.

28. The method of claim 27, wherein the repetition decoder operates on the lower layer.

29. The method of claim 24, wherein the removing step includes the step of providing a repetition decoded signal and the method further comprises the step of decoding the repetition decoded signal.

30. The method of claim 29, wherein the repetition decoded signal represents an average log-likelihood ratio (LLR) for every J received signal points of the at least one demodulated signal, where J>1.

31. The method of claim 29, wherein the repetition decoded signal represents an average of every J received signal points of the at least one demodulated signal, where J>1.

32. The method of claim 24, wherein the removing step comprises:

averaging soft input data derived from the at least one demodulated signal over a number of different alignments and providing a respective averaged signal associated with each alignment;

determining which averaged signal represents a better alignment as compared to the remaining averaged signals; and providing that averaged signal determined to represent the better alignment.

33. The method of claim 32, wherein the soft input data is a function of log-likelihood ratio (LLR) values associated with the at least one demodulated signal.

34. A method for use in a receiving apparatus, the method comprising:

using the receiving apparatus to perform the steps of:

demodulating a multi-level received signal to provide K demodulated signals, where K>1; and removing duplicated data from at least one of the K demodulated signals; and wherein the removing step comprises:

averaging soft input data derived from the at least one demodulated signal over a number of different alignments and providing a respective averaged signal associated with each alignment;

determining which averaged signal represents a better alignment as compared to the remaining averaged signals; and providing that averaged signal determined to represent the better alignment.

35. The method of claim 34, wherein the soft input data is a function of log-likelihood ratio (LLR) values associated with the at least one demodulated signal.

* * * * *

UNITED STATES PATENT AND TRADEMARK OFFICE
CERTIFICATE OF CORRECTION

| | | |
|---|---|---|
| PATENT NO. | : 7,616,706 B2 | Page 1 of 1 |
| APPLICATION NO. | : 10/556538 | |
| DATED | : November 10, 2009 | |
| INVENTOR(S) | : Joshua Lawrence Koslov | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1010 days.

Signed and Sealed this

Nineteenth Day of October, 2010

David J. Kappos
*Director of the United States Patent and Trademark Office*